United States Patent
Hicks et al.

(10) Patent No.: US 11,113,167 B1
(45) Date of Patent: Sep. 7, 2021

(54) SYSTEM TESTING INFRASTRUCTURE WITH HIDDEN VARIABLE, HIDDEN ATTRIBUTE, AND HIDDEN VALUE DETECTION

(71) Applicant: International Business Machines Corporation, Armonk, NY (US)

(72) Inventors: Andrew C. M. Hicks, Highland, NY (US); Daniel Nicolas Gisolfi, Hopewell Junction, NY (US); Dale E. Blue, Poughkeepsie, NY (US); Ryan Thomas Rawlins, New Paltz, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/121,825

(22) Filed: Dec. 15, 2020

(51) Int. Cl.
*G06F 11/263* (2006.01)
*G06F 11/267* (2006.01)

(52) U.S. Cl.
CPC .......... *G06F 11/263* (2013.01); *G06F 11/267* (2013.01)

(58) Field of Classification Search
CPC ................ G06F 11/263; G06F 11/267; G06F 11/3684–3692
See application file for complete search history.

(56) References Cited

U.S. PATENT DOCUMENTS

| 6,167,352 A | 12/2000 | Kanevsky et al. |
| 6,247,154 B1 | 6/2001 | Bushnell et al. |
| 6,917,840 B2 | 7/2005 | Lund |

(Continued)

FOREIGN PATENT DOCUMENTS

| CN | 102073585 A | 5/2011 |
| CN | 109460354 A | 3/2019 |

(Continued)

OTHER PUBLICATIONS

Blue, et al., "Practical Fault Localization with Combinatorial Test Design," 2019 IEEE International Conference on Software Testing, Verification and Validation Workshops (ICSTW), pp. 268-271.

(Continued)

*Primary Examiner* — Joseph R Kudirka
(74) *Attorney, Agent, or Firm* — Cantor Colburn LLP; Teddi Maranzano

(57) ABSTRACT

Inputs to a system under test (SUT) are modeled as a collection of attribute-value pairs. A set of testcases is executed using a set of test vectors that provides complete n-wise coverage of the attribute-value pairs. For each execution of the testcases, updating, for each execution of the set of testcases, for each testcase, a non-binary success rate ($S_T$) based on the binary execution results. In response to a first success rate corresponding to a particular testcase being below a predetermined threshold, a second set of testcases is generated based on the test vectors. For each testcase, a second success rate ($S_T'$) is computed based on a second set of execution results of a second set of testcases. In response to the second success rate corresponding to the particular testcase being substantially same as the first success rate, a user is notified of a defect in modeling the SUT inputs.

20 Claims, 14 Drawing Sheets

(56) References Cited

U.S. PATENT DOCUMENTS

| | | | |
|---|---|---|---|
| 7,480,602 B2 | | 1/2009 | Duffie et al. |
| 7,813,911 B2 | | 10/2010 | Triou, Jr. et al. |
| 8,090,565 B2 | | 1/2012 | Gaudette |
| 8,386,851 B2 | | 2/2013 | Ur |
| 8,756,460 B2 | * | 6/2014 | Blue .................. G06F 11/3676 |
| | | | 714/38.1 |
| 8,868,977 B2 | | 10/2014 | Birnbaum et al. |
| 9,218,271 B2 | * | 12/2015 | Segall ................. G06F 11/3676 |
| 9,600,403 B1 | | 3/2017 | Raz et al. |
| 9,792,204 B2 | | 10/2017 | Li et al. |
| 10,133,649 B2 | | 11/2018 | Li et al. |
| 2006/0010429 A1 | | 1/2006 | Ihara |
| 2006/0075305 A1 | | 4/2006 | Robinson et al. |
| 2009/0125270 A1 | | 5/2009 | O'Shea et al. |
| 2012/0317454 A1 | | 12/2012 | Krenz-Baath et al. |
| 2013/0090911 A1 | * | 4/2013 | Segall .................. G06F 11/263 |
| | | | 703/21 |
| 2013/0091382 A1 | | 4/2013 | Segall et al. |
| 2015/0178421 A1 | | 6/2015 | Borrelli et al. |
| 2020/0242010 A1 | | 7/2020 | Hicks et al. |
| 2020/0242012 A1 | | 7/2020 | Hicks et al. |
| 2020/0242013 A1 | | 7/2020 | Hicks et al. |

FOREIGN PATENT DOCUMENTS

| | | |
|---|---|---|
| CN | 110765699 A | 2/2020 |
| CN | 111259394 A | 6/2020 |
| JP | H03241439 A | 10/1991 |

OTHER PUBLICATIONS

Disclosed Anonymously, "Using differences between versions of a Cartesian product model to deduce necessary changes in a test plan," An IP.com Prior Art Database Technical Disclosure; IP.com No. IPCOM000219028D:IP.com Electronic Publication Date: Jun. 18, 2012; 4 pages.

Hicks et al., "System Testing Infrastructure With Hidden Variable, Hidden Attribute, and Hidden Value Detection," U.S. Appl. No. 17/121,854, filed Dec. 15, 2020.

Hicks et al., "System Testing Infrastructure With Hidden Variable, Hidden Attribute, and Hidden Value Detection," U.S. Appl. No. 17/121,850, filed Dec. 15, 2020.

Hicks et al., "System Testing Infrastructure With Hidden Variable, Hidden Attribute, and Hidden Value Detection," U.S. Appl. No. 17/121,852, filed Dec. 15, 2020.

Hicks et al., "Verification of Software Test Quality Using Hidden Variables," U.S. Appl. No. 17/122,009, filed Dec. 15, 2020.

Kochte, "Boolean Reasoning for Digital Circuits in Presence of Unknown Values, " May 22, 2014; 228 pages.

List of IBM Patents or Patent Applications Treated as Related; Date Filed: Jan. 7, 2021, 2 pages.

Python-Lattice Description, https://pypi.org/project/python-lattice/, downloaded January Jan. 7, 2021; 5 pages.

Wikipedia Definition of Heyting Algebra, https://en.wikipedia.org/wiki/Heyting_algebra, downloaded Jan. 7, 2021; 14 pages.

* cited by examiner

SYSTEM TESTING INFRASTRUCTURE WITH HIDDEN VARIABLE, HIDDEN ATTRIBUTE, AND HIDDEN VALUE DETECTION

BACKGROUND

The present inventions relate to testing of a computer system and, more specifically, a testcase infrastructure that can identify hidden variable(s), hidden attributes, and hidden attribute-values, that are not being tested, but should. Further, the present inventions relate to using the identified hidden variables to improve the testing infrastructure, for example, by generating additional testcases to test such variables, identifying code paths that have to be exercised, etc.

Computerized devices control almost every aspect of our life—from writing documents, controlling traffic lights, completing e-commerce transactions, to controlling spacecraft missions. However, computerized devices are often error-prone, and thus require a testing phase in which the errors are discovered and corrected. The testing phase is considered one of the most difficult tasks in designing a computerized device. Thorough testing is important, as the cost of not discovering an error may be enormous depending on how the computerized device is utilized. Coverage tools for checking software provide a measure of how well the software being evaluated has been exercised during testing and thereby give a level of assurance that the software is of high quality.

SUMMARY

According to one or more embodiments of the present invention, a method for detecting and localizing a fault when testing a system under test (SUT) includes modeling inputs to the SUT as a collection of attribute-value pairs. The method further includes generating an initial set of test vectors that provides complete n-wise coverage of a test space represented by the attribute-value pairs. The method further includes generating a set of testcases from the initial set of test vectors using combinatorics test design. The method further includes executing the set of testcases to obtain a set of execution results, the execution results being in binary form indicative that a testcase succeeded or failed, the set of testcases executed a plurality of times. The method further includes updating, for each execution of the set of testcases, for each testcase, a non-binary success rate ($S_T$) based on the execution results. The method further includes, in response to a first success rate corresponding to a particular testcase being below a predetermined threshold, generating a second set of testcases based on the test vectors, the second set of testcases generated using inverse combinatorics test design. The method further includes executing the second set of testcases to obtain a second set of execution results using the second set of test vectors, the second set of testcases is executed at least a predetermined number of times. The method further includes updating, for each execution of the second set of testcases, for each testcase, a second success rate ($S_T'$) based on the second set of execution results. The method further includes, in response to the second success rate corresponding to the particular testcase being substantially same as the first success rate, notifying a user of a defect in the modeling of the inputs to the SUT.

According to one or more embodiments of the present invention, a system includes a memory, and a processor coupled with the memory, the processor performs a method for detecting and localizing a fault when testing a system under test (SUT). The method includes modeling inputs to the SUT as a collection of attribute-value pairs. The method further includes generating an initial set of test vectors that provides complete n-wise coverage of a test space represented by the attribute-value pairs. The method further includes generating a set of testcases from the initial set of test vectors using combinatorics test design. The method further includes executing the set of testcases to obtain a set of execution results, the execution results being in binary form indicative that a testcase succeeded or failed, the set of testcases executed a plurality of times. The method further includes updating, for each execution of the set of testcases, for each testcase, a non-binary success rate ($S_T$) based on the execution results. The method further includes, in response to a first success rate corresponding to a particular testcase being below a predetermined threshold, generating a second set of testcases based on the test vectors, the second set of testcases generated using inverse combinatorics test design. The method further includes executing the second set of testcases to obtain a second set of execution results using the second set of test vectors, the second set of testcases is executed at least a predetermined number of times. The method further includes updating, for each execution of the second set of testcases, for each testcase, a second success rate ($S_T'$) based on the second set of execution results. The method further includes, in response to the second success rate corresponding to the particular testcase being substantially same as the first success rate, notifying a user of a defect in the modeling of the inputs to the SUT.

According to one or more embodiments of the present invention, a computer program product includes a computer-readable storage media having computer-executable instructions stored thereupon, which when executed by a processor cause the processor to perform a method for detecting and localizing a fault when testing a system under test (SUT). The method includes modeling inputs to the SUT as a collection of attribute-value pairs. The method further includes generating an initial set of test vectors that provides complete n-wise coverage of a test space represented by the attribute-value pairs. The method further includes generating a set of testcases from the initial set of test vectors using combinatorics test design. The method further includes executing the set of testcases to obtain a set of execution results, the execution results being in binary form indicative that a testcase succeeded or failed, the set of testcases executed a plurality of times. The method further includes updating, for each execution of the set of testcases, for each testcase, a non-binary success rate ($S_T$) based on the execution results. The method further includes, in response to a first success rate corresponding to a particular testcase being below a predetermined threshold, generating a second set of testcases based on the test vectors, the second set of testcases generated using inverse combinatorics test design. The method further includes executing the second set of testcases to obtain a second set of execution results using the second set of test vectors, the second set of testcases is executed at least a predetermined number of times. The method further includes updating, for each execution of the second set of testcases, for each testcase, a second success rate ($S_T'$) based on the second set of execution results. The method further includes, in response to the second success rate corresponding to the particular testcase being substantially same as the first success rate, notifying a user of a defect in the modeling of the inputs to the SUT.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
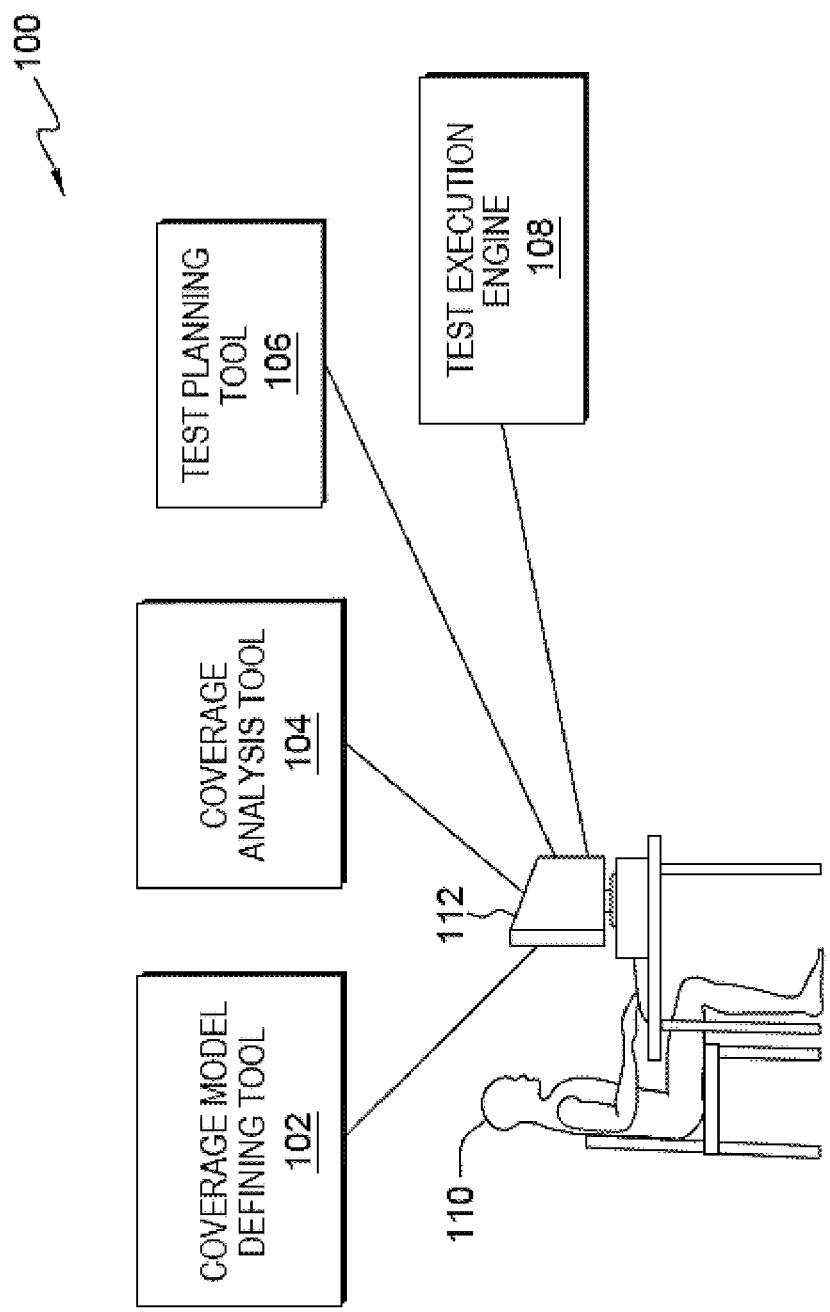
FIG. 1 shows a schematic illustration of a computerized environment in accordance with one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

DETAILED DESCRIPTION

Exemplary embodiments of the present invention relate to, among other things, devices, systems, methods, computer-readable media, techniques, and methodologies for performing fault detection and localization using combinatorial test design (CTD) techniques and for generating a regression bucket of testcases that expose the detected fault. In exemplary embodiments of the present invention, the detected and localized fault occurs in a system under test (SUT). The SUT may be a hardware system or a software system. Further, in exemplary embodiments of the present invention, the fault detection and localization may be performed while adhering to architectural restrictions on the SUT.

When assessing the quality of the SUT, it is imperative to identify the "weaker parts" of the SUT and understand why they exist. A "weaker part" in this context can be part of the SUT that is more prone to failures when one or more parameters associated with the SUT change. For example, a "hidden attribute" that causes failures can be considered a weak part of the SUT. Parameters associated with the SUT can include configurable values of the SUT, for example, amount of memory, number of processors, or any other such hardware/software that form the SUT, and any settings associated with the hardware and/or software of the SUT. In addition, the parameters of the SUT that can affect the success/failure of the SUT, or the success/failure of one or more testcases of the SUT can include operating conditions associated with the SUT, such as, temperature, humidity, electric power, combination of software applications being executed in conjunction, number/type of jobs being executed by the SUT in conjunction, and any other such dynamic conditions that can vary from one instance of the SUT to another.

Existing techniques to identify a weaker part of the SUT are narrow in scope, and do not describe enough of the metrics that cause failures or errors. Hence, the metrics are not sufficient to explain a cause of one or more such failures. Some such existing techniques, like calculating the success rate of a given testcase, can provide an early warning sign of an underlying problem with the SUT. However, identifying the underlying problem requires manual intervention and deep skills in the art.

For example, a testcase failure can be because of an error in the implementation of the SUT itself, such as a bug. Alternatively, the testcase failure can be because of an incorrect user input. Alternatively, the testcase failure can be caused by an operating condition that causes the SUT to operate in an unpredicted manner. Further yet, the testcase failure can be because of an attribute, or value that is not being tested (and hence, not being adjusted) in the testcase. In addition, the testcase failure can be occurring in a first SUT with a certain configuration, but not in a second SUT with substantially the same configuration.

When testing the SUT, it is observed that some errors are not surfaced consistently due to a requirement of specific environmental or timing circumstances. For example, in the case of a software SUT, the circumstances can include one or more parameters of a computer system on which the software is being executed. For example, the parameters can include settings of the computer system, other software being executed on the computer system, a hardware configuration of the computer system, and the like. In a similar manner, in the case of a hardware SUT, the configuration of a system of which the hardware SUT is a part of can affect the environmental conditions. In other words, particular errors in the SUT can be a result of the system state and not the quality of the SUT itself. Such errors are sometimes referred to as "soft failures." Identifying such conditions, referred herein as "hidden variables," which can lead to soft failures is a technical challenge. Additionally, identifying the soft failures, i.e., determining that an error is a soft failure can also be a technical challenge.

This difficulty is especially exacerbated when hidden variables in the SUT have a profound effect on the outcome of the tests. A hidden variable can be factor that is not being controlled, and in some cases may not be controllable, when executing a testcase. For example, any of the operating conditions of the SUT, such as the temperature, humidity, combination of jobs, available memory, etc. that are not configured by the testcase itself, but may cause the testcase to fail intermittently can be considered a hidden variable. Hidden variables are not always discoverable for a given test infrastructure because they are outside the specific scope of the SUT. A stress test, for example, may drive the SUT into a configuration where various resources (e.g. memory, compute cycles, etc.) are constrained therefore causing unpredictable errors or failures in the SUT that are difficult, if not impossible, to consistently reproduce. This means that a resource that the stress test relies on may cause the SUT to perform inadequately or fail even though the specific function or feature that the stress test verifies is stable.

Thus, a technical challenge exists with testing infrastructures to determine that one or more hidden variables consistently affect the outcome of a given testcase, and further identify such hidden variables. Further, a technical challenge exists to identify such hidden variables when a testcase is failing due to factors beyond the test infrastructure itself such that resources can be adjusted or new test infrastructure can be developed accordingly.

Embodiments of the present invention address such technical challenges with testing infrastructure for computer systems. It should be noted that the testing infrastructure itself includes computer systems, including memory devices, processing units, and one or more computer executable instructions. Accordingly, embodiments of the present invention facilitate improvements to computing technology, the testing infrastructure and the SUT. In one or more embodiments of the present invention, embodiments of the present invention, by utilizing Pseudo-Boolean algebra, such as Heyting algebra, can quantize the success rate of a test vector while encapsulating the hidden variables that consistently affect the outcome of the testcase. For example, for a test vector <Andrew, Blue, 30>, which in this case has three attributes <Name, Color, Age> with assigned combination of values, the success rate indicates how often a test case succeeds while using this specific combination of values. An "attribute-value pair" represents a particular value that is assigned to a particular attribute being tested by the testcases. The attribute is cycled through multiple values during the testing. Further, there can be several such attributes that are tested. The quantization of the success rate of an attribute-value pair enables a user, such as quality assurance engineer, to reliably identify when the testcase is failing due to factors beyond the test infrastructure itself such that resources can be adjusted or new test infrastructure can be developed accordingly. This enhanced success metric can be used to improve the efficiency and reliability of a testing effort to improve the overall stability of the SUT. Accordingly, embodiments of the present invention provide improvements, practical applications, and technical solutions to technical challenges in the computing technology, particularly testing infrastructure used to test a SUT.

Additionally, coverage tools for testing the SUT provide a measure of how well the SUT has been exercised during testing and thereby give a level of assurance that the SUT is of high quality. There are a number of types of coverage known in the art, such as statement coverage, line coverage, condition coverage, path coverage, method coverage, and the like. One additional coverage method is functional coverage. Functional coverage is designed to measure an amount, portion or similar metric of tests that examined predetermined functional behaviors. Once functional coverage is measured, quality assurance (QA) personnel may design additional tests to examine untested behaviors.

However, test infrastructure can become incredibly expensive and cost per test cycle increases without continuous optimization of products, tests, and environments. As more tests are added, more test suites are run, and the complexity of the supporting services increases along with the cost of each test cycle. Test environments, test dependencies, and test suites need to be managed with the same rigor as the product being shipped (i.e., the SUT). Accordingly, managing the test infrastructure is a technical challenge, and in turn, efficient reduction of the test infrastructure is a technical challenge. It should be noted that the reduction of the test infrastructure does not imply a reduction in quality of testing the SUT. Rather, the technical challenge is that the quality of the tests is to be improved along with the reduction in the test infrastructure.

Embodiments of the present invention address such technical challenges. According to one or more embodiments of the present invention, a reduced set of testcases for a SUT are executed on the system. It should be noted that the system is different than the SUT; the SUT is being executed using the system. The reduced set of testcases can be generated using combinatorics test designing (CTD). Errors can be identified based on a subset of tests that fail from that reduced set. Further, according to one or more embodiments of the present invention, inverse CTD is used to localize the fault in the system.

According to one or more embodiments of the present invention, CTD is performed with respect to an interaction requirement, such as a pair-wise interaction, n-tuple interaction, or any other. The test plan may provide for sufficient coverage tasks that assure that the interaction requirement is fulfilled. In some exemplary embodiments, test planning is based on a modeling of the test space using a functional coverage model. The test space can represent inputs, scenarios, configurations, the application's internal state, or any other aspect that might need to be tested. The functional coverage model may include a set of functional attributes. In other embodiments of the present invention, the coverage model can include one from a number of types of coverage known in the art, such as statement coverage, line coverage, condition coverage, path coverage, method coverage, and the like. The type of coverage does not affect reduction of the test infrastructure techniques described herein.

Further, with respect to test planning, a test-space may define potential tests that may be executed on the SUT. A test can be associated with exactly one potential test, as opposed to coverage tasks. In some exemplary embodiments of the present invention, several different tests may hold the same potential test.

In some exemplary embodiments of the present invention, the motivation for the approach of CTD is that most errors depend on the interaction between a small number of functional attributes. CTD algorithms may also deal with scalability issues. The CTD algorithms may assume that the combinations space is too large to be represented explicitly, and they use various techniques to try to generate an optimized test plan without explicitly enumerating all possible combinations. Examples of such algorithms may be a reduction to the orthogonal arrays or covering array problems. Those techniques are limited in the type of restrictions they allow on the value combinations, or in the type of requested interaction level, and still hit scalability issues as the number of model variables increases.

In one or more embodiments of the present invention, inputs to a SUT are modeled as a collection of attribute-value pairs. More specifically, inputs to a SUT can be modeled as a collection of attributes, each of which can take on one or more corresponding attribute-values. In one or more embodiments of the present invention, the entire Cartesian product space that contains all possible combinations of attribute-value pairs can be reduced to a smaller set of test vectors that provides complete n-wise coverage of the entire test space. For instance, if it is assumed that four different attributes A, B, C, and D are modeled, and if it is further assumed that attribute A can take on four distinct values; attribute B can take on three distinct values; attribute C can take on three distinct values; and attribute D can take on two distinct values, then the total number of possible combinations of attribute-value pairs would be 4*3*3*2=72. Thus, in this illustrative example, the entire Cartesian product space would include 72 different combinations of attribute-value pairs. As previously noted, these 72 different combinations of attribute-value pairs can be reduced down to a smaller set of combinations that still provide complete n-wise coverage of the Cartesian product space. For instance, referring to the same example introduced above, if complete pairwise coverage is sought, then the 72 different combinations can be reduced down to 12 distinct combinations that together include every possible pairwise interaction of attribute-values. The reduced number of combinations required to provide n-wise coverage may increase logarithmically as n increases.

In exemplary embodiments of the present invention, the entire Cartesian product space including all combinations of attribute-value pairs is reduced down to a smaller set of CTD test vectors that provides complete n-wise coverage for a desired n. In complex hardware or software systems, the total number of attributes and corresponding candidate attribute-values may be quite large, in which case, the total number of possible combinations of attribute-values making up the entire Cartesian product space may be astronomically large, making it practically infeasible to test all possible combinations. Reduction of the entire Cartesian product space down to a substantially smaller number of CTD test vectors that still provide complete n-wise coverage allows for any n-wise (or m-wise where m<n) fault to be detected without having to directly test every possible combination in the test space.

In exemplary embodiments of the present invention, a binary decision diagram or the like may be used to perform the reduction and identify the reduced set of CTD vectors that provides complete n-wise coverage. In one or more embodiments of the present invention, each CTD test vector that is generated includes a unique combination of attribute-values, and the set of CTD test vectors together include every possible n-wise interaction of attribute-values. In particular, each CTD vector may have a dimension corresponding to the number of attributes that are modeled, where each element of the CTD vector is a respective attribute-value for a corresponding attribute. The set of CTD vectors that is generated, however, may not be unique. That is, there may be multiple different sets of CTD vectors, each of which provides complete n-wise coverage. In one or more embodiments of the present invention, the CTD vectors may be chosen at random while still ensuring complete n-wise coverage. In other one or more embodiments, the initial set of CTD vectors may be chosen with specific criteria in mind such as, for example, to increase or decrease the representation of particular attribute-values within the set of CTD vectors.

In exemplary embodiments of the present invention, once the initial set of CTD test vectors are generated, they are used to generate a corresponding set of testcases. For instance, the set of CTD test vectors may be provided as input to a testcase generation tool configured to generate a respective corresponding testcase for each CTD vector. Each testcase may be designed to test the interactions among the particular combination of attribute-values contained in the corresponding CTD vector.

In exemplary embodiments of the present invention, the testcases are then executed. The execution of each testcase results in either a successful execution result, indicating that the combination of attribute-values associated with the testcase does not contain an n-wise (or m-wise where m<n) error, or a failure execution result, indicating that the combination of attribute-values associated with the testcase do contain an n-wise (or m-wise where m<n) error. In one or more embodiments of the present invention, a particular failing testcase is then selected and inverse combinatorics is applied to the failing testcase to produce a new set of testcases capable of exposing the bug. In exemplary embodiments of the present invention, application of inverse combinatorics to the selected failing testcase includes generating a respective new testcase with respect to each attribute. Thus, the number of new testcases generated may be equal to the number of attributes. In exemplary embodiments of the present invention, in each new testcase, the attribute-value of a corresponding attribute in the selected failing testcase is changed to an attribute-value for that attribute that is not present in any failing testcase and the respective attribute-value for each other attribute is unchanged from that which is present in the selected failing testcase.

Those new testcase(s) that yield a successful execution result may then be assessed to detect and localize the n-wise (or m-wise where m<n) error. In particular, the specific attribute-value pairs that cause the error may be identified based on those new testcases that successfully execute. A regression bucket of testcases may then be generated based on the error-producing combination of attribute-value pairs. More specifically, every possible combination of attribute-values that include the attribute-values determined to cause the error may be determined and a regression bucket of corresponding testcases for testing these combinations can be outputted for use by a manual tester, for example. In particular, in one or more embodiments of the present invention, all testcases contained in the regression bucket will fail when executed until the bug is fixed, after which all regression bucket testcases should pass (i.e., produce a successful execution result).

In exemplary embodiments of the present invention, architectural restrictions may apply to the SUT. Architectural restrictions may include any of a variety of restrictions on inputs to the SUT. For instance, an example restriction may be that if a given attribute has a particular attribute-value, then one or more other attributes are excluded from having certain attribute-value(s). Another example architectural restriction may be that if a given attribute has a particular attribute-value, then one or more other attributes must have certain attribute-value(s). Yet another example architectural restriction may be that a new attribute is introduced if and only if a particular attribute has a particular attribute-value. It should be appreciated that the above examples of architectural restrictions are merely illustrative and not exhaustive.

In exemplary embodiments of the present invention, architectural restrictions are considered prior to performing the reduction of the entire Cartesian space down to the initial set of CTD vectors that provides the desired complete n-wise coverage. That is, in exemplary embodiments of the present invention, particular combinations of attribute-values that violate any architectural restrictions are first excluded from the Cartesian product space, and then the reduction down to the set of CTD vectors that provides complete desired n-wise coverage is performed. In this manner, it can be ensured that no combination of attribute-values that violates an architectural restriction is included in the initial set of CTD vectors. Further, in exemplary embodiments of the present invention, when a selected testcase corresponding to an initial CTD vector fails and is selected for expansion to obtain a set of new testcases designed to detect and localize an n-wise error, that expansion can be performed first without taking into account any architectural restrictions. Then, any new testcases that violate an architectural restriction can be excluded. In this manner, it can be ensured that the expansion provides as much coverage of the test space in the neighborhood around the failing testcase as possible. In addition, in exemplary embodiments of the present invention, the regression bucket of failing testcases may first be generated without regards to architectural restrictions, and then any testcases that violate an architectural restriction can be excluded from the regression bucket. That is, testcases corresponding to all possible combinations in the entire Cartesian product test space that include the particular combination of attribute-values causing an n-wise or lesser order error may first be generated and then reduced down to exclude any testcase(s) that violate a restriction. Alternatively, the testcases included in the regression bucket may be selected from the reduced Cartesian space from which the initial set of CTD vectors are selected, in which case, the regression bucket is generated to include only those combinations of attribute-values that include the subset of attribute-values causing the error and that do not violate any architectural restriction.

One or more embodiments of the invention include various technical features that yield technical effects that provide various improvements to computer technology. For instance, exemplary embodiments of the invention include the technical feature of inverse combinatorics to expand a set of testcases from a selected failing testcase. This technical feature allows for an n-wise or lesser order fault to be detected and localized within a single iteration of the expansion. This technical effect represents an improvement to debugging and fault detection computer technology because it automates the creation of additional testcases around a selected failing testcase in a manner that is specifically designed to facilitate detection and localization of a fault. Thus, the automated generation of new testcases in accordance with one or more embodiments of the invention is capable of exposing a fault more efficiently and using a fundamentally different methodology than manual testcase generation. Exemplary embodiments of the invention also include the technical feature of generating a regression bucket of testcases that tests every possible combination of attribute-values that includes the particular subset of attribute-values causing the n-wise fault. Thus, the regression bucket includes only testcases that would all fail prior to correction of the fault and that would all pass after correction of the fault. Thus, the automated generation of a regression bucket of failing testcases in accordance with one or more embodiments of the invention provides an improvement to computer technology by providing a tester or automated testing algorithm with a set of testcases—each of which is ensured to fail—such that the tester or automated testing algorithm can use the regression bucket of testcases to verify that a fault has been corrected when all testcases ultimately pass after debugging is performed.

During the life cycle of an effort to test the SUT, considerable time and resources are invested into building up sustainable, trustworthy testcases and infrastructure to provide a consistent testing system to execute the testcases to verify the SUT. The end result of building the testing system is a reliable, efficient way to continuously verify the SUT throughout the lifetime of the SUT, especially as maintenance and updates are applied overtime. A common way of insuring sufficient test coverage is through the use of CTD to ensure that the test coverage is sufficient.

A technical challenge with this paradigm lies in the test model designers either missing attribute-values from those that are to be tested, or defining insufficient granularity for the values for an attribute to be tested. In such cases, the testing model that is generated for use by the testing system can be incomplete, leading to incomplete testing of the SUT. Another technical challenge is uneven use of any one test attribute variable value over time due to the particular algorithm used to generate the tests. This case also results in some of the attribute-values not being exercised, again resulting in incomplete testing of the SUT. In addition to the missing attribute-values, as noted earlier, the technical challenges also include the hidden variables causing the testcases failing to test and/or identify a root cause of a failure that the SUT may be experiencing.

It should be noted that a "hidden variable" may fail intermittently due to difficult to control parameters such as other applications, jobs, or services running concurrently with the SUT, temperature of the SUT, etc. A "hidden attribute" is an attribute that should be included in the model to generate better test vectors. A "hidden attribute-value" is a value that should be included in the attribute in a model to generate better test vectors, but was missed/overlooked at the time of creating the test model, or that the users were not aware of when designing the test model. Whereas, a "hidden value" is an environmental/outside factor that influences the result: of one or more testcases.

Embodiments of the present invention address such technical challenges by using CTD to automatically generate and select testcases to test a SUT, and further facilitating the use of Pseudo-Boolean algebra, such as Heyting algebra, Kripke algebra, or any other intuitionistic logic to detect one or more hidden variables causing failure of one or more of the testcases. Embodiments of the present invention further facilitate using the detected hidden variables to determine one or more portions of the SUT that may need to be further diagnosed to detect an error that may be causing a failure of the testcase(s).

In one or more embodiments of the present invention, to recognize the missing/hidden attributes that are to be tested, a success rate for each attribute-value pair over time is computed using Psuedo-Boolean algorithms. The history of the success rate is then displayed visually using an unevenly distributed visual representation, which can be referred to as a non-uniform table or heat-map of the test vectors attribute-values of a model used to test the SUT. Alternatively, or in addition, based on the historical data, an attribute in the model is identified that contains values which has a success rate that does not satisfy a predetermined threshold. The identified attribute is used to identify and reveal a lack of depth in a set of values used to test at least that attribute. By adding additional values to the attribute, and any other associated attributes, the success rate of the attribute is monitored over time again. If the success rate threshold is satisfied, it can be deemed that a hidden value, or a hidden attribute has been identified by the values that were added. The hidden value can then be used in further set of testcases.

Referring now to FIG. 1, which shows a schematic illustration of a computerized environment in accordance with embodiments of the present invention. A computerized environment 100 may include one or more computerized tools. It should be noted that the depiction is one possible example of a block diagram and that some components may not be depicted for clarity.

In one or more embodiments of the present invention, a user 110, such as a developer, a QA staff member, a tester, a designer, a verification engineer or the like, may interact with the computerized environment 100. The user 110 may utilize a man-machine interface (MMI) 112 such as a terminal, a display, a keyboard, an input device or the like.

In some exemplary embodiments of the present invention, a coverage model defining tool 102 may be utilized to define the test coverage model, such as a functional coverage model, or the like. In some exemplary embodiments of the present invention, the user 110 may define the attributes that are to be tested, for example, the functional attributes in case a functional coverage is being tested. In some exemplary embodiments of the present invention, a similar tool may be utilized to define a test-space. In some exemplary embodiments, the coverage model may be adapted to be utilized as a test model.

In some exemplary embodiments of the present invention, a test execution engine 108 may be utilized to test the SUT. It will be noted that the SUT may be hardware, firmware, software, combination thereof, or any other type of computerized device. The test execution engine 108 may be a simulation-based verification tool, a test-generation platform, or the like. The test execution engine 108 may be operatively coupled to a test planning tool 106 and configured to perform testing in accordance with the test plan. In some exemplary embodiments, the test planning tool 106 may provide the tests for the test execution engine 108 to perform. It will be noted that dynamic verification is a broader concept than testing the SUT, and it further includes test planning, coverage analysis and the like. The test execution engine 108 provides only one aspect of the entire scope of operations that may be performed during dynamic verification and should not be used to construe the term "dynamic verification" narrowly.

In some exemplary embodiments of the present invention, a coverage analysis tool 104 is configured to measure coverage of the test space for the SUT based on the dynamic verification performed by the test execution engine 108. For example, the coverage analysis tool 104 can be a functional coverage analysis tool. The coverage analysis tool 104 provides a coverage measurement, such as a portion of the coverage test-space or of the defined test plan, indicative of coverage tasks that were covered during dynamic verifica-tion performed by the test execution engine 108. The user 110 may review the coverage measurement and/or the list of covered tasks.

In some exemplary embodiments of the present invention, a test planning tool 106 may define a test plan to be covered. In some exemplary embodiments of the present invention, the test plan may be a set of coverage tasks to be covered. In some exemplary embodiments of the present invention, the test plan tool 106 may provide tests that are likely to cover the test plan, such as based on a test benchmark stored in a datastore which includes tests that are known/estimated to cover specific aspects of the SUT. As another example, the test plan tool 106 is configured to generate tests so as to cover coverage tasks. The user 110 may review the test plan, the selected test or the like. In some exemplary embodiments of the present invention, the user 110 may provide parameters for the test planning tool 106 to use in determining the objective of the test plan, such as a desired interaction level. Embodiments of the present invention enable the elimination of any redundancy in the generated tests.

While the depiction in FIG. 1 has been described with specific components including the coverage model defining tool 102, coverage analysis tool 104, test planning tool 106 and the test execution engine 108, embodiments of the present invention are not limited to these components or system configurations and can be implemented with other system configuration employing fewer or additional components.

Figure 2:
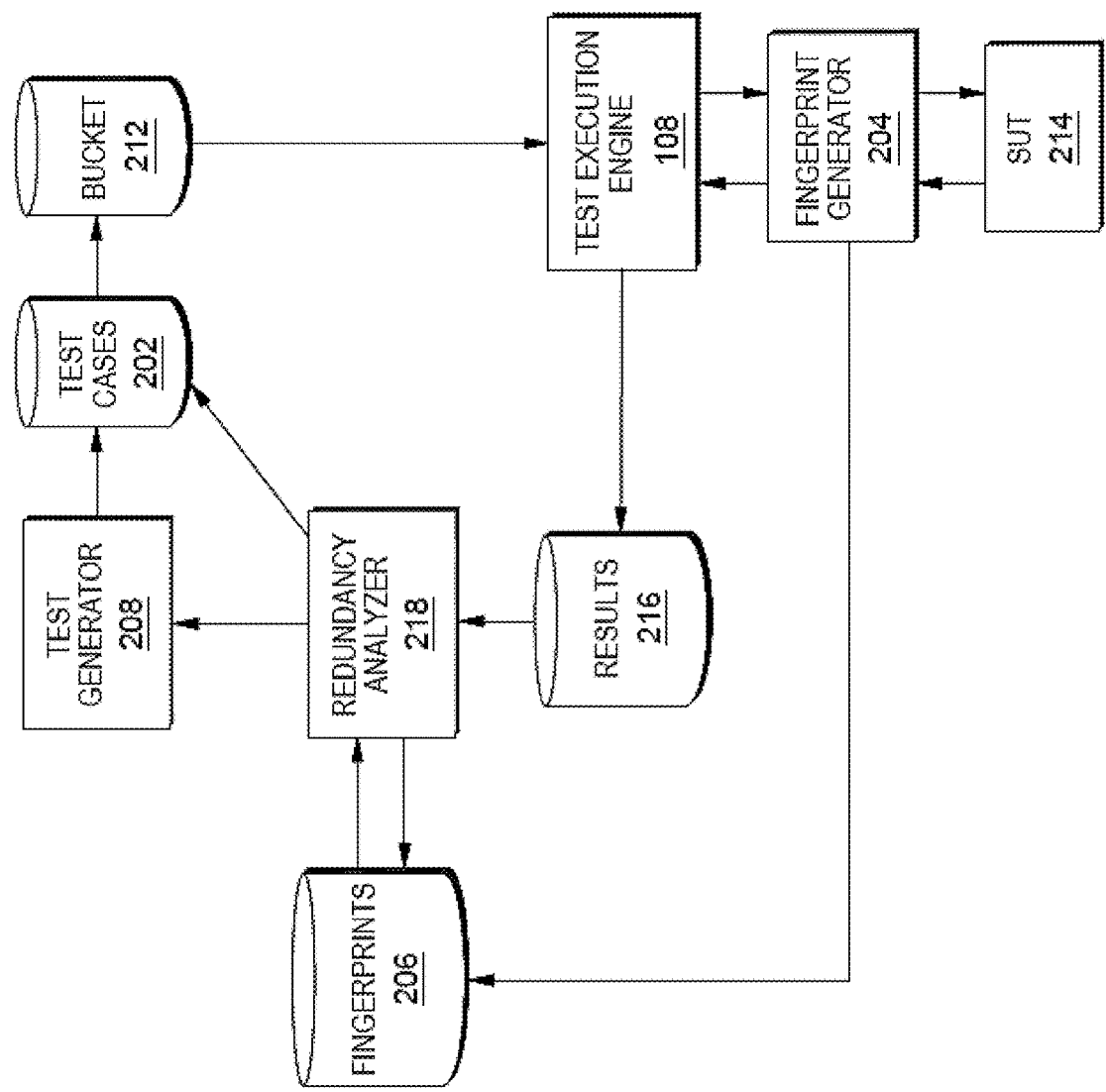
FIG. 2 is a block diagram representing modules providing a testing infrastructure according to an embodiment of the present invention.

FIG. 2 is a block diagram representing modules providing a testing infrastructure according to an embodiment of the invention. More specifically, the infrastructure includes a test generator 208. The test generator 208 accesses a test infrastructure, such as a repository of testcases 202, which stores suites of testcases available to verify the correctness of the SUT 214. Each testcase specifies an input to be applied to the SUT 214 and the expected response that should be returned in response to this input (to indicate its correct operation). Typically, the testcases are organized into sets (test suites), for example, each test suite for a different component of the SUT 214.

The test generator 208 creates an execution bucket for each run of the test on the SUT 214. The bucket specifies the operations to be performed for running the desired testcases in a machine-readable language (such as XML-based). Particularly, in the case of a complete test, all the available testcases are executed on each component of the SUT 214; conversely, in the case of a regression test, the execution is limited to a subset of selected testcases. The bucket so obtained can be saved into a file.

A test execution engine 108 controls the execution of the bucket read from the file. For each testcase of the bucket 212, this involves the application of the corresponding input (attribute-values) to the SUT 214. In response thereto, the SUT 214 returns a corresponding output to the test execution engine 108. The test execution engine 108 determines the result of the testcase by comparing its output with the corresponding expected response (extracted from the file, for example). The result of the testcase (i.e., positive when the two values match and negative otherwise) is saved into a log. For example, this may be achieved by means of a standard Test Tracking Tool (TTT). The results of the (current) run of the test are available in the log for their analysis.

For a large, complex SUT 214, the testcase infrastructure 202 can contain a large amount of duplicate test actions/testcases. In accordance with certain embodiments of the present invention, one technique developed to address these challenges incorporates the use of a fingerprint repository 206 with a store of information including a set of fingerprints that correspond to a plurality of regression tests stored in the test repository 202. In one embodiment, the fingerprints are generated by a fingerprint generator 204. For instance, the fingerprint repository 206 can include fingerprints of most, if not all, of the tests stored in the test repository 202 and a reference to where copies of the test are located throughout the test infrastructure, similar to an index in a book. Each fingerprint uniquely identifies a specific code path covered by a corresponding testcase. In this manner, the system can identify fingerprints (and corresponding tests) that are redundant, and in some cases duplicate.

According to embodiments of the present invention, processing of the results 216 of the regression tests generated by the test generator 208 and executed by the test execution engine 108 may include determination of a code path traversed during execution of each generated regression test and generation of a fingerprint for each executed regression testcase based at least in part on the code path. In some embodiments of the present invention, these steps may be performed by the fingerprint generator 204. Here, a "code path" associated with a testcase refers to a portion of the SUT 214 that is exercised by the testcase.

A redundancy analyzer 218 compares fingerprints corresponding to all testcases generated by the test generator 208 to a plurality of fingerprints stored in the fingerprint repository 206. The redundancy analyzer 218 provides a list of the regression testcases generated by the test generator 208 that have matching fingerprints with one or more fingerprints stored in the fingerprint repository 206. This information is used to select and discard the duplicate testcases from the test repository 202 (as described below).

Figure 3:
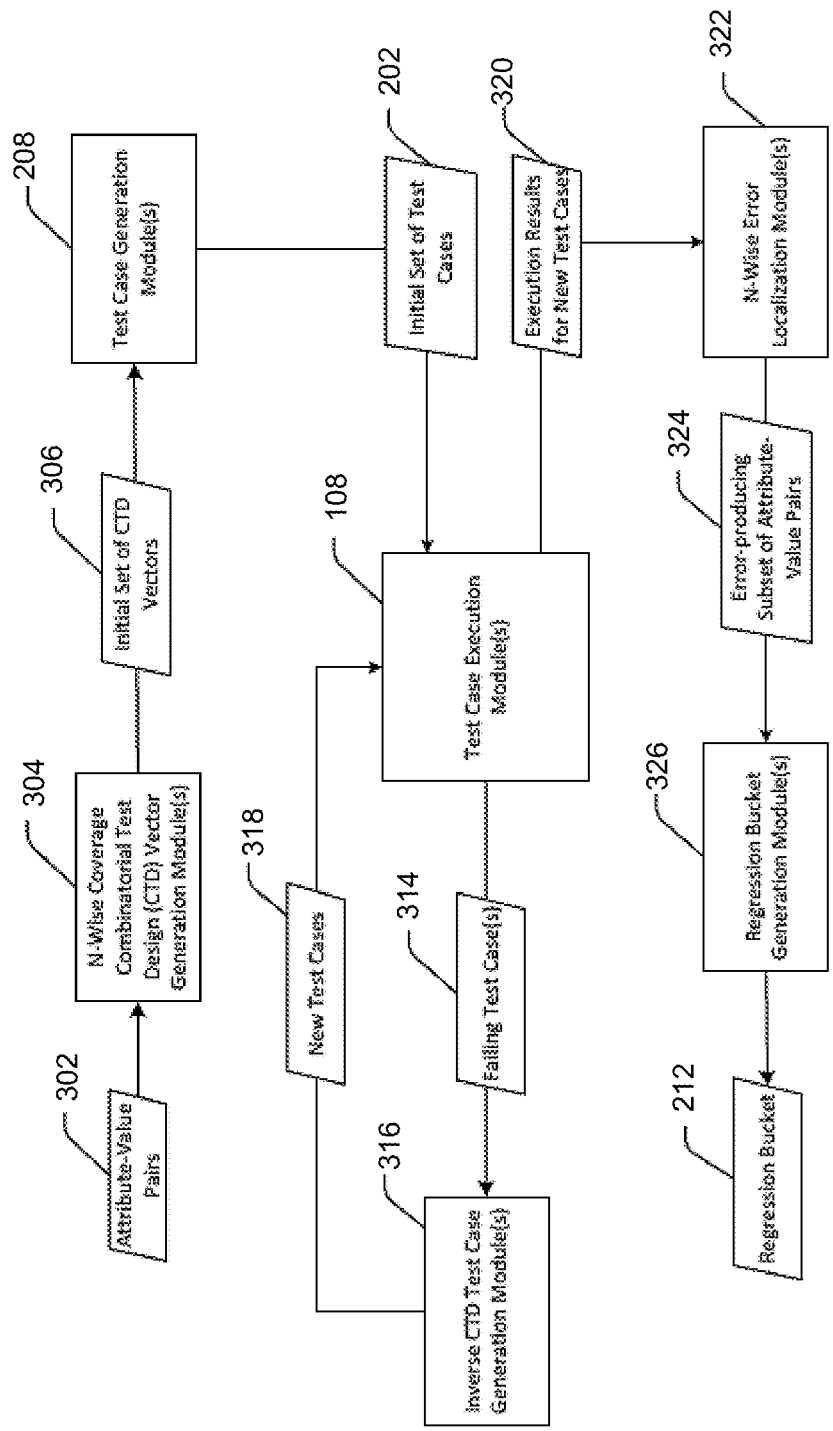
FIG. 3 is a schematic hybrid data flow/block diagram illustrating fault detection and localization using combinatorics test design (CTD) and generation of a regression bucket of failing testcases that expose a detected fault in accordance with one or more one or more embodiments of the present invention.

FIG. 3 is a schematic hybrid data flow/block diagram illustrating fault detection and localization using CTD techniques and generation of a regression bucket of failing testcases that expose a detected fault in accordance with one or more one or more embodiments of the invention. FIG. 6 is a process flow diagram of an illustrative method 600 for detecting and localizing an n-wise fault using CTD techniques and generating a regression bucket of failing testcases that expose the detected n-wise fault in accordance with one or more one or more embodiments of the invention. FIG. 6 is described in conjunction with FIGS. 1-5.

Illustrative methods in accordance with one or more embodiments of the invention and corresponding data structures (e.g., modules, units, and other such components) for performing the methods are now described. It should be noted that each operation of one or more methods described herein may be performed by one or more of the modules or the like described herein. These modules may be implemented in any combination of hardware, software, and/or firmware as described herein. In certain one or more embodiments, one or more of these modules may be implemented, at least in part, as software and/or firmware modules that include computer-executable instructions that when executed by a processing circuit cause one or more operations to be performed. A system or device described herein as being configured to implement one or more embodiments may include one or more processing circuits, each of which may include one or more processing units or nodes. Computer-executable instructions may include computer-executable program code that when executed by a processing unit may cause input data contained in or referenced by the computer-executable program code to be accessed and processed to yield output data.

Referring to FIG. 6 in conjunction with FIG. 3, in one or more embodiments of the present invention, at block 602 of the method 600, inputs to the SUT 214 are modeled as a collection of attribute-value pairs 302. Any number of attributes may be used to model SUT inputs and each attribute may take on any number of candidate attribute-values. At block 604, computer-executable instructions of one or more n-wise coverage CTD vector generation modules 304 are executed to generate an initial set of CTD vectors 306 that provides n-wise coverage of an entire Cartesian product space associated with the collection of attribute-value pairs 302.

Figure 4:
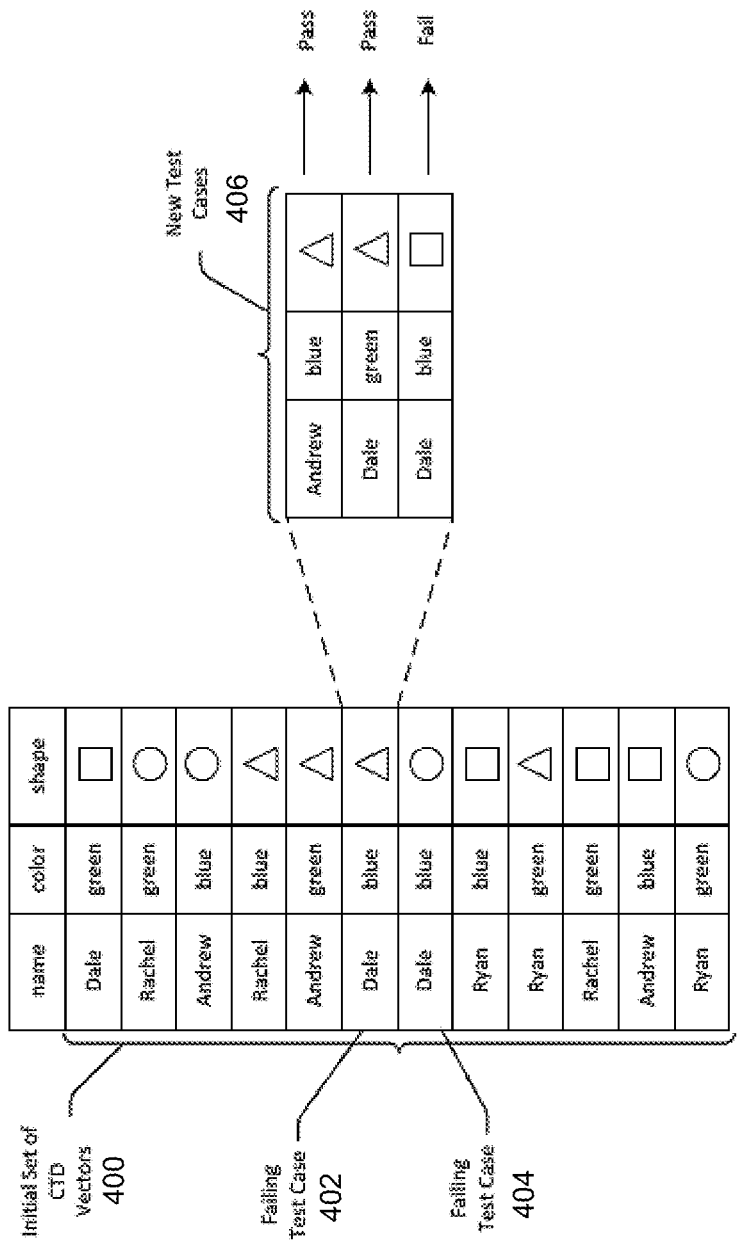
FIG. 4 depicts an example set of CTD vectors according to one or more embodiments of the present invention.

In particular, the entire Cartesian product space that contains all possible combinations of the attribute-value pairs 302 is reduced to a smaller set of CTD test vectors 306 that provides complete n-wise coverage of the entire test space. In one or more embodiments of the present invention, the complete n-wise coverage provided by the set of CTD vectors 306 may be complete pairwise coverage. For instance, if it is assumed that three attributes are modeled, namely, a "name" attribute, a "color" attribute, and a "shape" attribute as shown in FIG. 4, and if it is further assumed that the "name" attribute can take on 4 distinct attributes (Dale, Rachel, Andrew, and Ryan), the "color" attribute can take on 2 distinct attributes (green, blue), and the "shape" attribute can take on 3 distinct attributes (circle, square, triangle), then the total number of possible combinations of attribute-value pairs would be 4*3*2=24. Thus, in this illustrative example, the entire Cartesian product space would include 24 different combinations of attribute-value pairs.

The 24 different combinations of attribute-value pairs can be reduced down to a smaller set of combinations (i.e., the set of CTD vectors 306) that still provides complete n-wise coverage of the Cartesian product space. For instance, if complete pairwise coverage is sought, then the 24 different combinations can be reduced down to 12 distinct combinations that together include every possible pairwise interaction of attribute-values. An example set of CTD vectors 400 is shown in FIG. 4. The example set of CTD vectors 400 includes all pairwise interactions between the attribute-values of the attributes "name," "color," and "shape."

A binary decision diagram or the like may be used to perform the reduction and identify the reduced set of CTD vectors 306 that provides complete n-wise coverage. While each CTD vector in the set of CTD vectors 306 includes a unique combination of attribute-values, the set of CTD vectors 306 itself may not be unique. That is, there may be multiple different sets of CTD vectors, each of which provides complete n-wise coverage. For instance, while FIG. 4 depicts an example set of CTD vectors 400 for the example attributes and attribute-values described, it should be appreciated that alternative sets of CTD vectors that include different combinations of attribute-values may also independently provide complete n-wise coverage. It should further be appreciated that while the example set of CTD vectors 400 provides complete pairwise coverage and partial three-wise coverage, a greater number of CTD vectors would be needed to provide complete three-wise coverage. Stated more generally, as n increases, the number of CTD vectors needed to provide complete n-wise coverage increases logarithmically with n.

Figure 5:
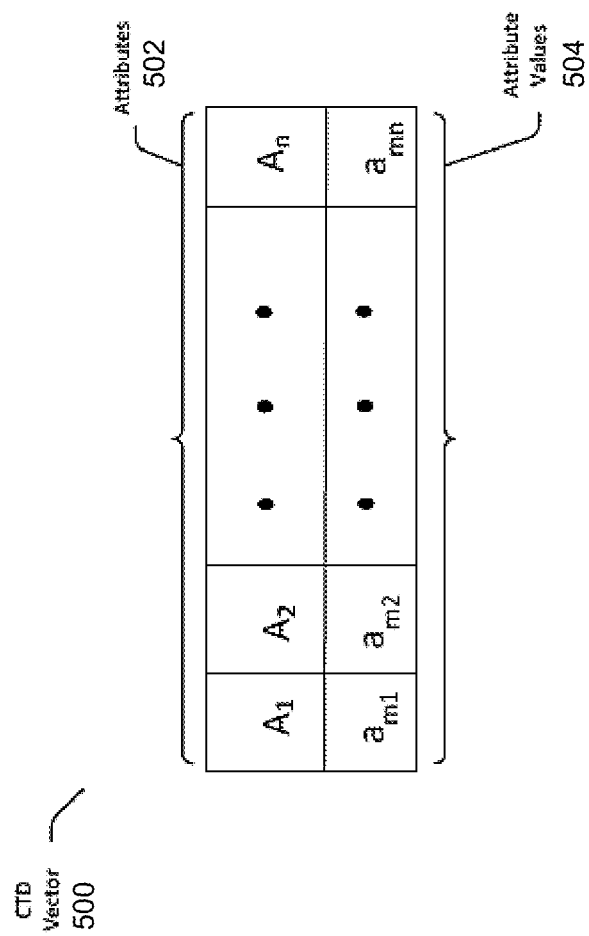
FIG. 5 depicts an example CTD vector according to one or more embodiments of the present invention.
Figure 6:
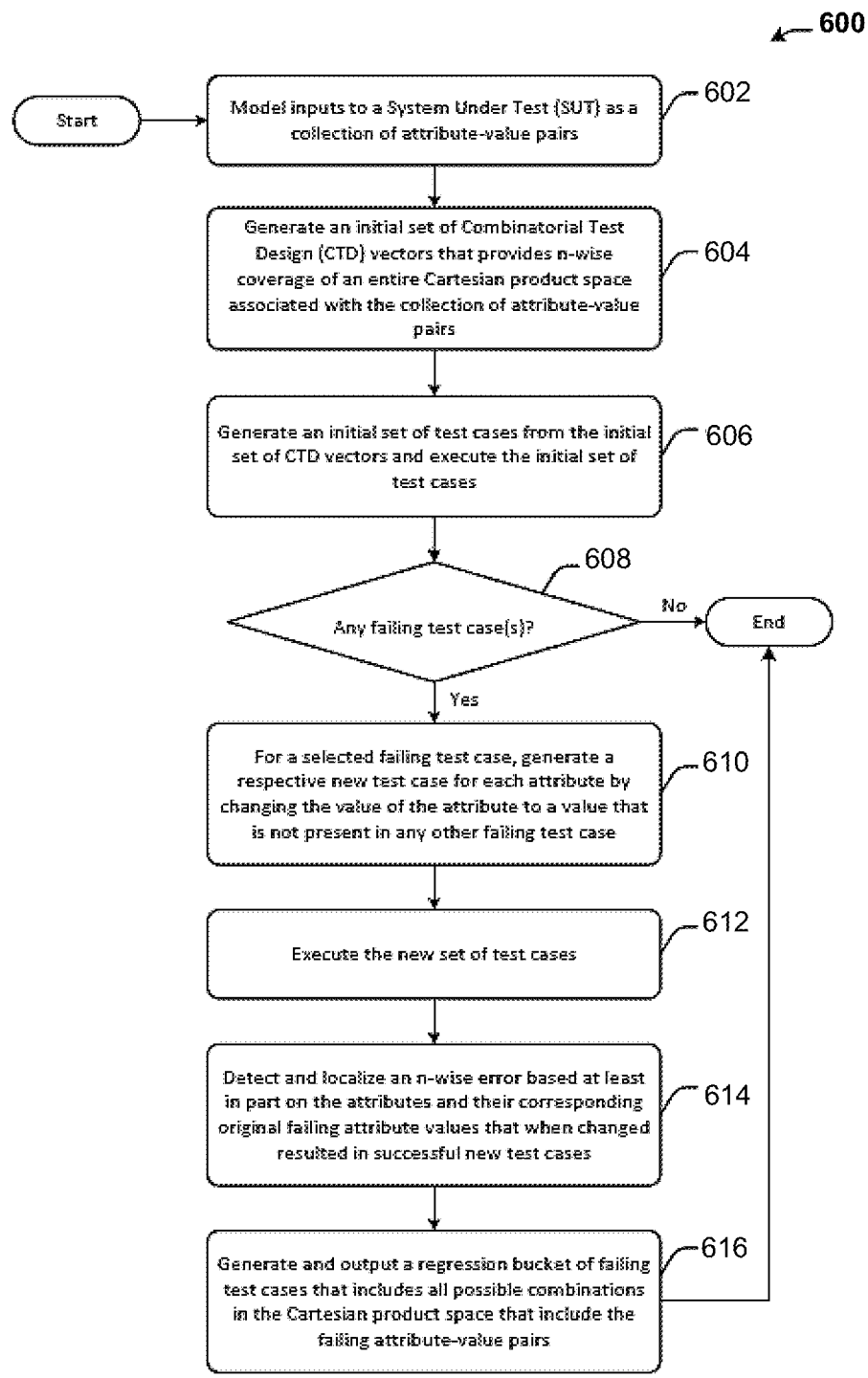
FIG. 6 is a process flow diagram of an illustrative method for detecting and localizing an n-wise fault using CTD techniques and generating a regression bucket of failing testcases that expose the detected n-wise fault in accordance with one or more one or more embodiments of the present invention.

FIG. 5 depicts an example CTD vector 500 of the type that may be included in the set of CTD vectors 306. The example CTD vector 500 includes multiple attributes 502. As previously described, the attributes 502 may be used to model inputs to the SUT 214. The attributes 502 may be associated with attribute-values 504. In particular, each attribute 502 may have a corresponding attribute-value 504, which may be one of one or more candidate attribute-values that the attribute is allowed to take on.

In one or more embodiments of the present invention, architectural restrictions are taken into account in method 600 prior to performing the reduction of the entire Cartesian space down to the initial set of CTD vectors 306 that provides desired complete n-wise coverage. That is, particular combinations of attribute-values that violate any architectural restrictions are first excluded from the Cartesian product space, and then the reduction down to the set of CTD vectors 306 that provides complete desired n-wise coverage is performed. In this manner, it can be ensured that no combination of attribute-values that violates an architectural restriction is included in the initial set of CTD vectors 306.

Architectural restrictions may include any of a variety of restrictions on inputs to the SUT 214. For instance, an example restriction may be that if a given attribute has a particular attribute-value, then one or more other attributes are excluded from having certain attribute-value(s). Another example architectural restriction may be that if a given attribute has a particular attribute-value, then one or more other attributes must have certain attribute-value(s). Yet another example architectural restriction may be that a new attribute is introduced if and only if a particular attribute has a particular attribute-value. It should be appreciated that the above examples of architectural restrictions are merely illustrative and not exhaustive.

Referring again to FIG. 6, at block 606 of the method 600, in one or more embodiments of the present invention, the testcase generation modules 208 may be executed to generate, from the initial set of CTD test vectors 306, a corresponding set of testcases 202, which are then executed by the testcase execution module(s) 108 to yield an execution result (pass or fail) for each testcase.

For instance, the set of CTD test vectors 306 may be provided as input to a testcase generation tool 208 that generates a respective corresponding testcase for each CTD vector. Each testcase in the set of testcases 202 tests the interactions among the particular combination of attribute-values contained in a corresponding CTD vector of the set of CTD vectors 306. It should be appreciated that a set of CTD vectors and their corresponding testcases may, at times herein, be described and/or depicted interchangeably. For instance, the example set of CTD vectors 400 depicted in FIG. 4 may be interchangeably thought of as the corresponding set of testcases that test the particular combinations of attribute-values represented by the set of CTD vectors 400.

At block 608 of the method 600, computer-executable instructions of the testcase execution module(s) 108 are executed to determine whether any testcases in the set of testcases 202 failed. In one or more embodiments of the present invention, execution of each testcase 202 results in either a successful execution result, indicating that the combination of attribute-values contained in the corresponding CTD vector 306 does not contain an n-wise (or m-wise where m<n) error, or a failure execution result, indicating that the combination of attribute-values in the corresponding CTD vector 306 does contain an n-wise (or m-wise where m<n) error.

Referring to the example depicted in FIG. 4, testcases corresponding to the example set of CTD vectors 400 are executed at block 606 to yield a respective execution result for each testcase. In particular, two testcases 402 and 404 are illustratively depicted in FIG. 4 as resulting in failure. Failing testcase 402 tests the following combination of attribute-values: Dale; blue; triangle, which respectively correspond to the attributes name, color, and shape. Failing testcase 404 tests the following combination of attribute-values: Dale; blue; circle, which respectively correspond to the attributes name, color, and shape. Although "Dale" and "blue" are present both in the CTD vector corresponding to failing testcase 402 and in the CTD vector corresponding to failing testcase 404, it is unclear at this stage in the process as to whether "Dale" and "blue" are generating a pairwise error; whether "Dale" and ("triangle" or "circle") are generating the pairwise errors; or whether "blue" and "triangle" or "circle") are generating the pairwise errors. Subsequent operations of method 600 can utilize inverse combinatorics to expand the test space around a selected failing testcase to detect and localize the particular combination of attribute-values that are causing the n-wise error (pairwise error in the case of the example depicted in FIG. 4).

Responsive to a negative determination at block 608, the method 600 may end because none of the initial set of testcases 202 has failed. Because the initial set of CTD vectors 306 (based on which the set of testcases 202 are generated) provided complete n-wise coverage, it can be ensured that an n-wise or lesser order error is not present. However, successful execution of all of the testcases in the initial set of testcases 202 does not ensure that a higher order error (k-wise where k>n) is not present.

On the other hand, in response to a positive determination at block 608 indicating that execution of the set of testcases 202 results in one or more failing testcases 314, the method 600 includes using an inverse CTD testcase generation module 316 to execute and to select a particular failing testcase 314 and apply inverse combinatorics to the selected failing testcase 314 to produce a new set of testcases 318 capable of being used to detect and localize the combination of attribute-values that are causing the n-wise or lesser order error.

In one or more embodiments of the present invention, application of inverse combinatorics to the selected failing testcase 314 includes generating a respective new testcase 318 with respect to each attribute. Thus, the number of new testcases generated may be equal to the number of attributes. In one or more embodiments, in each new testcase 318, the attribute-value in the selected failing testcase 314 of a corresponding attribute is changed to an attribute-value for that attribute that is not present in any other failing testcase and the respective attribute-value for each other attribute is unchanged from that which is present in the selected failing testcase 314.

Referring again to the example depicted in FIG. 4, assuming that failing testcase 402 is selected at block 610, then the example set of new testcases 406 may be generated. In one or more embodiments of the present invention, each example new testcase 406 may be generated by changing the attribute-value of a corresponding attribute in the selected failing testcase 402 to a different value that is not present in any other failing testcase. For instance, a first new testcase corresponding to the CTD vector <Andrew, blue, triangle> is obtained by changing the attribute-value of the "name" attribute in the failing testcase 402 from "Dale" to "Andrew" while keeping the attribute-values for the other attributes the same as in the failing testcase 402. Similarly, a second new testcase corresponding to the CTD vector <Dale, green, triangle> is obtained by changing the attribute-value of the "color" attribute in the failing testcase 402 from "Blue" to "Green" while keeping the attribute-values for the other attributes the same as in the failing testcase 402. Lastly, a third new testcase corresponding to the CTD vector <Dale, blue, square> is obtained by changing the attribute-value of the "shape" attribute in the failing testcase 402 from "triangle" to "square" while keeping the attribute-values for the other attributes the same as in the failing testcase 402.

It should be appreciated that the respective attribute-value that is changed to obtain each new testcase 406 is obviously not present in the selected failing testcase 402. Moreover, each changed attribute-value is not present in any other failing testcase as well (e.g., failing testcase 404). Specifically, the changed attribute-value "Andrew" for the first new testcase is not present in any failing testcase; the changed attribute-value "green" for the second new testcase is not present in any failing testcase; and the changed attribute-value "square" for the third new testcase is not present in any failing testcase.

After generating the set of new testcases 318 by performing inverse combinatorics on a selected failing testcase 314, the testcase execution module(s) 108 is used for executing the new testcases 318, at block 612 of the method 600. Further, at block 614, one or more n-wise error localization modules 322 detect and localize an n-wise or lesser order error based on the attributes and their corresponding original failing attribute-values in the selected failing testcase 314 that when changed resulted in new testcases that pass. In particular, computer-executable instructions of the n-wise error localization module(s) 322 are executed to assess execution results 320 for the set of new testcases 318 to detect and localize an n-wise or lesser order error based on those new testcases that yield a successful execution result. As used herein, a lesser order error refers to an m-wise error where m<n, assuming complete n-wise coverage by the set of CTD vectors 306.

Referring again to the example depicted in FIG. 4 which assumes detection and localization of a pairwise error, execution of the set of new testcases 406 results in the first new testcase corresponding to the CTD vector <Andrew, blue, triangle> passing; the second new testcase corresponding to the CTD vector <Dale, green, triangle> passing; and the third new testcase corresponding the CTD vector <Dale, blue, square> failing. In one or more embodiments, the n-wise error localization module(s) 322 determine, based on the failing execution result for the third new testcase, that the "shape" attribute is not contributing to a pairwise error because changing the attribute-value from "triangle" in the failing test 402 to "square" in the third new testcase continues to result in failure.

On the other hand, the n-wise error localization module(s) 322 may determine that the attributes whose attribute-values were changed to obtain the new testcases that passed execution do contribute to the pairwise error. Specifically, in one or more embodiments of the present invention, based on the successful execution result for the first new testcase corresponding to the CTD vector <Andrew, blue, triangle>, the n-wise error localization module(s) 322 determines that the "name" attribute and the original failing attribute-value "Dale" are contributing to the pairwise error. Similarly, in one or more embodiments, based on the successful execution result for the second new testcase corresponding to the CTD vector <Dale, green, triangle>, the n-wise error localization module(s) 322 determines that the "color" attribute and the original failing attribute-value "blue" are also contributing to the pairwise error.

Thus, based on the execution results 320 for the set of new testcases 318, the n-wise error localization module(s) 322 can determine, in the example depicted in FIG. 4, that the attributes "name" and "color" having the attribute-values "Dale" and "blue," respectively, are responsible for the pairwise error. Stated more generally, the n-wise error localization module(s) 322 can determine the specific attribute-value pairs that cause an n-wise or lesser order error based on an assessment of the execution results 320 for the set of new cases 318, and more specifically, the original attribute-values that were changed in the selected failing testcase to obtain passing new testcases.

The example depicted in FIG. 4 assumes an initial set of CTD vectors 400 that provides complete pairwise coverage, in which case, a pairwise or lesser order error (e.g., a single attribute-value that causes an error) can be detected and localized in a single pass of applying inverse combinatorics on a selected failing testcase to obtain the set of new testcases 318. In general, if the initial set of CTD vectors 306 provides n-wise coverage, then a single pass of applying inverse combinatorics on a selected failing testcase reveals an n-wise or lesser order error. While a k-wise error where k>n may be detectable using an initial set of CTD vectors that provides complete n-wise coverage, this is not a guarantee because the initial set of CTD vectors 306 would not include all k-wise interactions. However, an initial set of CTD vectors 306 that provides complete n-wise coverage (e.g., complete pairwise coverage) may provide some degree of k-wise coverage where k>n (e.g., three-wise coverage), and thus, based on the particular CTD vectors that are chosen, the method 600 can reveal a k-wise error at a single pass or after multiple passes of applying inverse combinatorics to selected failing testcases.

Referring again to FIG. 6, at block 616 of the method 600, computer-executable instructions of one or more regression bucket generation module(s) 326 are executed to generate and output a regression bucket 212 of failing testcases that includes all possible combinations in the Cartesian product space that include the original failing attribute-value pairs. The regression bucket generation module 326, in one or more embodiments of the present invention, receives an indication of the error-producing subset of attribute-value pairs 324 as input and determines and outputs the regression bucket 212 that includes only those testcases that correspond to all possible combinations in the Cartesian product space that include the particular attribute-values that are causing the detected error.

Referring again to the example of FIG. 4, the regression bucket generation module 326 receives as input the attributes "name" and "color" and the corresponding attribute-values "Dale" and "blue" that are causing the pairwise error, determines all attribute-value combinations in the Cartesian product space that include "Dale" and "blue," and populates the regression bucket 212 with testcases corresponding to all of these combinations. In this example, the regression bucket 212 includes the following testcases: (Dale, blue, triangle); (Dale, blue, circle); and (Dale, blue, square). Because each of the testcases in the regression bucket 212 includes the attribute-values "Dale" and "blue" for the attributes "name" and "color," respectively, which together are contributing to the detected pairwise error, each testcase in the regression bucket 212 is ensured to fail. In one or more embodiments of the present invention, the regression bucket 212 can be outputted for use by a manual tester or another automated debugging algorithm. The regression bucket 212 of failing testcases can be used to verify whether the detected error has been corrected because all testcases contained in the regression bucket 212 will pass only when the error is fixed. Thus, if any testcase in the regression bucket 212 continues to fail despite modifications made to the SUT 214 in an attempt to correct the error, then this indicates that the error has not been completely resolved.

Figure 7:
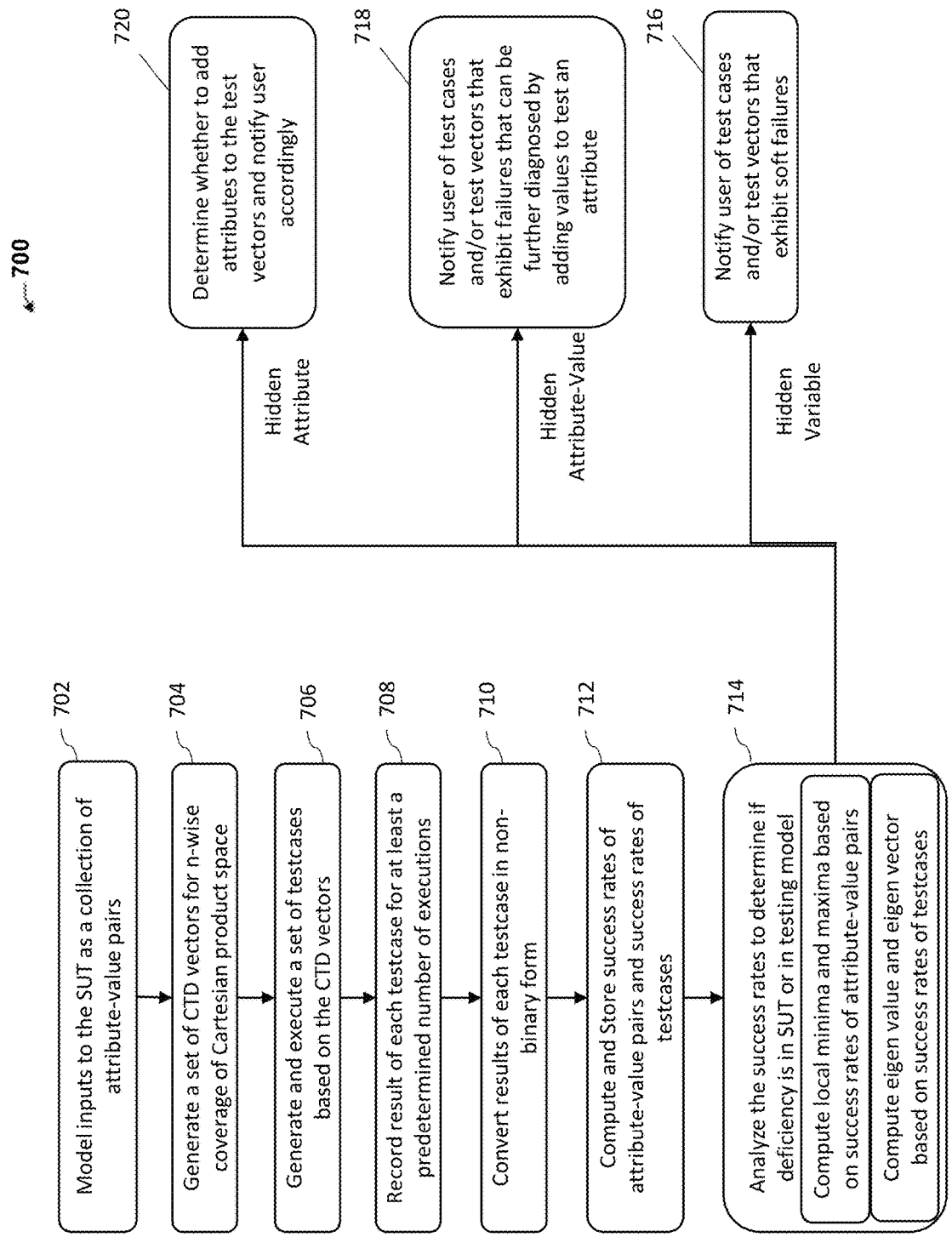
FIG. 7 depicts a flowchart of a method for detecting deficiencies in a testing model using success rates of attribute-value pairs over time when testing a system under test according to one or more embodiments of the present invention.

FIG. 7 depicts a flowchart of a method for detecting deficiencies in a testing model using success rates of attribute-value pairs over time when testing a SUT according to one or more embodiments of the present invention. The method 700 includes modeling the attribute-value pairs for testing the SUT 214, at block 702. The modeling is similar to that performed in the method 600 and generates a dictionary of attributes and their corresponding values that can be used to create all combinations of testcases.

At block 704, the n-wise coverage CTD vector generation module 304 generates a set of CTD vectors 306 to test the SUT 214 with n-wise coverage using the model. In one or more embodiments of the present invention, the CTD vectors 306 are generated from the entire Cartesian product space of the attributes that are tested for the SUT 214. In example embodiments of the present invention, each CTD vector 306 is selected only from the reduced test space that excludes invalid combinations of attribute-values that violate architectural restrictions of the SUT 214. For example, the CTD vector generation module 304 reduces the entire Cartesian product space associated with the collection of attribute-value pairs 302 down by identifying and excluding those combinations that do not adhere to architectural restrictions associated with the SUT 214.

At block 706, a set of testcases 202 is generated from the initial set of CTD vectors 306 and executed similar to block 606 of the method 600. In one or more embodiments of the present invention, generating and executing the testcases 202 can include using inverse combinatorics based on one or more failing testcases 202 to generate additional testcases 202.

At block 708, the result of each of the testcases 202 is recorded for at least a predetermined number of executions of the testcases 202, i.e., repeated executions of the same set of testcases 202. The number of executions of the testcases 202 can be limited using a predetermined number of executions, such as 10, 100, 1000 etc., or using a predetermined duration of time, e.g., executions over an hour, day, a week, a month, etc.

A result of executing testcase is binary, i.e., PASS or FAIL. Accordingly, for a given configuration of the SUT 214, without any configuration changes, it may be expected that the result of the testcases 202 do not change over the multiple executions. However, as noted earlier, because of hidden attributes, the same testcase that passes (or fails) in one execution, with a specific configuration of the SUT 214, can fail (or pass) in another execution, with the same configuration. Accordingly, the result of the testcases 202 are converted into a non-binary form prior to storing the results, at block 710.

Converting the results of the testcases 202 into non-binary form is performed by computing a success rate of the attribute-value pairs used by the testcases. In one or more embodiments of the present invention, the success rate is computed using Pseudo-Boolean Algebra, such as Heyting algebra, to quantize a vector of Boolean outcomes that represent a successful/failed testcase. In one or more embodiments of the present invention, an eigen value is calculated based on the success rates (i.e., Heyting values) computed for each attribute-value pairs used by testcases of the test model. All of the computed success rates of the test model are aggregated into an eigen vector which is then used to calculate an eigen value. The success rate (or failure rate) of each attribute-value pair ($S_{AV}$) is computed based on execution of each testcase. Thus, the success rate ($S_{AV}$) of an attribute-value pair is a non-binary value that describes the success/fail rate of a given attribute-value pair over time, where the success rate is computed using Pseudo-Boolean algebra. The vector that includes results of multiple executions of a testcase using an attribute-value pair can be quantized as $S_{AV}=f(t1, t2 \ldots tn)$, where $S_{AV}$=success rate of the attribute-value pair, ti=1/0 based on success/failure of testcase i, n=number of testcase executions, and f=Pseudo-Boolean algebra function that converts the Boolean ti values to non-binary $S_{AV}$. Here, n can be a number of testcases that use the attribute-value pair, and the number of times the testcases are executed.

In addition, success rate ($S_T$) (or failure rate) for each testcase is also monitored and recorded as a non-binary value. The success rate ($S_T$) of a testcase is computed using Pseudo-Boolean Algebra to quantize a vector of testcase execution results over time. For example, the vector that includes results of multiple executions of testcase can be quantized as $S_T=g(t1, t2 \ldots tn)$, where $S_T$=success rate of the testcase, ti=1/0 based on success/failure of testcase i, n=number of testcase executions, and g=Pseudo-Boolean algebra function that converts the Boolean ti values to non-binary $S_T$. Here, n can be a number of times the testcase is executed. In one or more embodiments of the present invention, an eigen value is calculated based on the success rates (i.e., Heyting values) computed for each test vector (i.e., testcase) of a test model. All of the computed success rates of the test model are aggregated into an eigen vector which is then used to calculate an eigen value Tables 1 and 2 depict example test vectors, where the attributes being tested include <name, color, state, age> and the values used are from the sets shown in Table 1. It is understood that this is just one example, and that in other embodiments of the present invention, the test vectors can include different attributes, and/or a different number of attributes in the test vectors. Also, the values of the attributes can vary from those depicted herein. Table 1 depicts the success rates for each attribute-value pair, while Table 2 depicts the success rates for each testcase. A success rate of a testcase can be the same as the success rate of a test vector. The last column of Table 2 is an eigen vector of the Pseudo-Boolean algebra, and includes all of the success rates. The eigen value is a numerical representation of the eigen vector.

TABLE 1

| Table 1A | | Table 1B | | Table 1C | | Table 1D | |
| --- | --- | --- | --- | --- | --- | --- | --- |
| Name | Success Rate | Color | Success Rate | State | Success Rate | Age | Success Rate |
| Andrew | $S_{AV1}$ | Blue | $S_{AV3}$ | Connecticut | $S_{AV5}$ | 20 | $S_{AV7}$ |
| Dan | $S_{AV2}$ | Black | $S_{AV4}$ | New York | $S_{AV6}$ | 30 | $S_{AV8}$ |

TABLE 2

| Test vector # | Name | Color | State | Age | Success Rate ($S_T$) |
| --- | --- | --- | --- | --- | --- |
| 1 | Andrew | Black | Connecticut | 20 | $S_{T1}$ |
| 2 | Dan | Black | Connecticut | 20 | $S_{T2}$ |
| 3 | Andrew | Blue | Connecticut | 20 | $S_{T3}$ |

TABLE 2-continued

| Test vector # | Name | Color | State | Age | Success Rate ($S_T$) |
|---|---|---|---|---|---|
| 4 | Andrew | Black | New York | 20 | $S_{T4}$ |
| 5 | Andrew | Black | Connecticut | 30 | $S_{T5}$ |

It should be noted that a "hidden variable" may cause a testcase to fail intermittently due to difficult to a soft failure such as other applications, jobs, or services running concurrently with the SUT 214, temperature of the SUT 214, etc. A "hidden attribute" is an attribute that should be included in the model to generate test vectors with different combination of attributes. Further, a "hidden attribute-value" is a value that should be included to test an attribute that is already in the model, i.e., the combination of attributes does not change, rather combination of attribute-values used to test the SLIT 214 is changed. A "hidden value" is an environmental/outside factor that influences the result of one or more testcases; a hidden variable is a type of a hidden value.

In the example of Table 2, the testcases using the combination of attribute-values represented by the test vector #1 fail 50% of the times, and the test vectors #2 and #5 result in the testcases passing 100% of the tittles. The test vectors #1, #2, and #5, differ from each other by a single value, as can be seen.

Let us assume; for the sake of this example, that the combination of the attribute-values <Color, Black> and <State, Connecticut> cause the testcase to fail. If that is the case, per Pseudo-Boolean algebra, it can be deemed that the testcases with the test vectors #2 and #5 should have also failed with success rate 50% (same as vector #1). But because that is not the case here, it can be deemed that there is a "hidden variable" that the model does not have control over, i.e., a soft failure caused by, for example, an unknown environmental condition. Further, if all three test vectors, #1, #2, and #5, resulted in 50% success rate, it can be deemed that there is a "hidden attribute" that has to be used to generate additional test vectors. Further yet, by adding one or more values to the range of the attributes and monitoring the success rate of the new attribute-values over time, a "hidden attribute-value" can be detected if a threshold success rate is satisfied by using the one or more additional values. Also, when a hidden variable is present, and causes intermittent failure, as testcases are executed, the success rate of a specific test vector may change over time.

At block 712, the success rates ($S_{AV}$) of the attribute-value pairs are stored in a data structure, such as a Karnaugh map, a heatmap, or any other form of a non-uniform data structure that can be analyzed for detecting trends of the attributes over time. The data structure is non-uniform because each attribute can have a different number of values that are tested.

Figure 8:
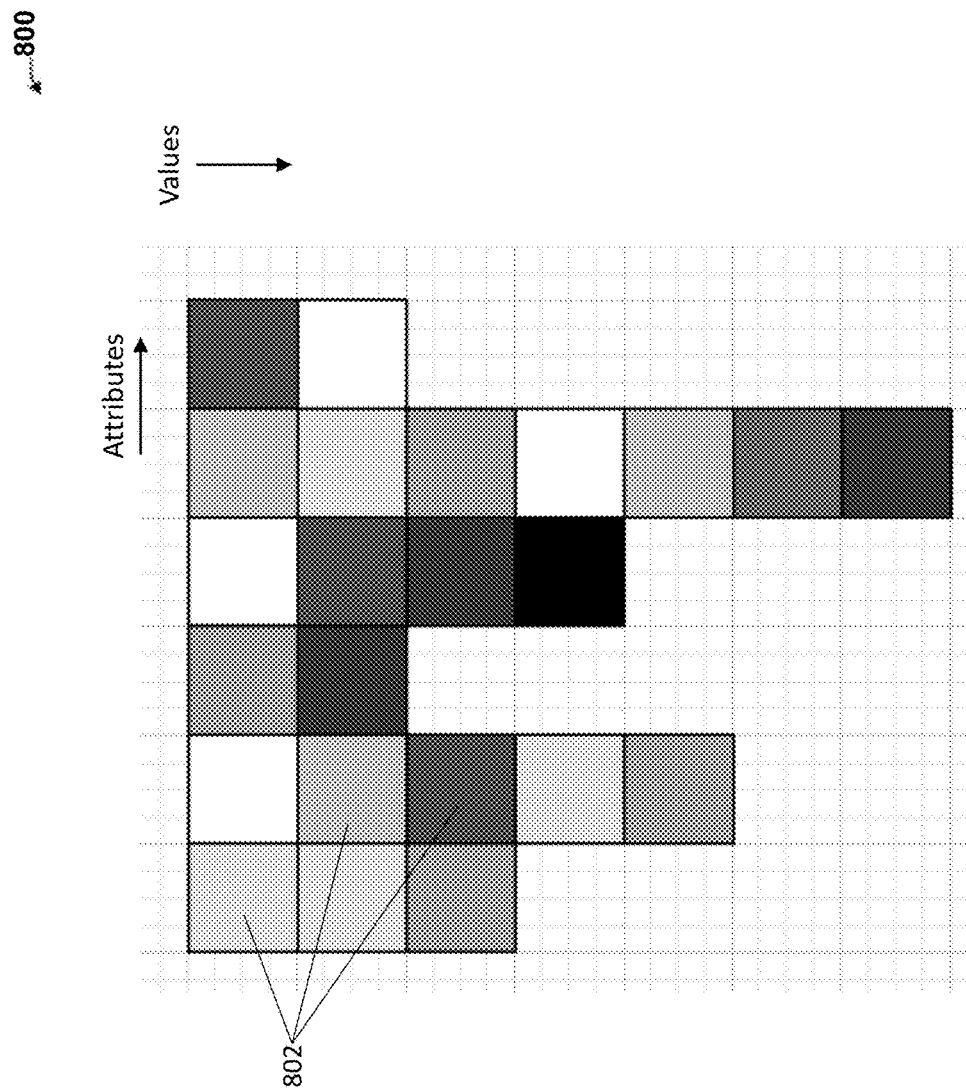
FIG. 8 depicts an example visualization of success rates ($S_{AV}$) of attribute-value pairs according to one or more embodiments of the present invention.

FIG. 8 depicts an example visualization of success rates ($S_{AV}$) of attribute-value pairs according to one or more embodiments of the present invention. The visualization 800 can be generated based on the data structure used for storing the success rates ($S_{AV}$) using techniques, such as generating a heatmap, a polygon, or any other representation to visualize the non-uniform table of success rates ($S_{AV}$). The visualization 800 is a non-uniform heat-map in which a color or shading of each square 802 represents a success rate ($S_{AV}$) of an attribute-value pair corresponding to that square 802. In the particular example shown, the darker the square, the lesser the success rate ($S_{AV}$), and conversely, the brighter the square the higher the success rate ($S_{AV}$) of the corresponding attribute-value pair. However, it is understood that the heat-map 800 can be shaded using different rules in other embodiments. Alternatively, or in addition, the success rate ($S_{AV}$) can be represented using a different property of the visualization, other than color, for example, a size may be used. Further, it is understood that although the visualization 800 is a 2D depiction, in other embodiments of the present invention, the visualization can use different number of dimensions, such as 3D.

Using the visualization 800, by analyzing a particular range of attributes, the effectiveness of each attribute can reveal a lack or of depth in the model's attribute-values. For example, if the attribute "age" in the visualization 800 shows a success rate ($S_{AV}$) above (or below) a threshold for each attribute-value pair, the range of values used to test the attribute may be underdeveloped. Otherwise if adding additional values to the attribute does not change the visualization 800 (i.e., the underlying success rates) by at least a predetermined threshold, then the attribute is deemed to be sufficiently explored.

At block 714, the success rates are analyzed to determine deficiencies of the testing model and/or data. The deficiencies can include hidden variable(s), hidden attribute(s), and/or hidden attribute-value(s). In one or more embodiments of the present invention, the test model is used to create a test bucket which can be run. Using the results the inverse combinatoric set for each failed test vector can be computed. Inverse Combinatorics, which is a known technique, facilitates identifying all failing test vectors. For each failing test vector, an inverse combinatoric set is generated. For each inverse combinatoric set a new test bucket is generated to test and diagnose the SUT to determine a cause of the failing testcases. Further, in one or more embodiments of the present invention, the inverse testcases are run and the results are used to perform root cause analysis, which results in locating the source of the failure in the original test model.

In one or more embodiments of the present invention, the analysis includes computing an eigen value and an eigen vector based on the success rates ($S_T$) of the testcases 202. For example, the $S=<S_{T1}, S_{T2} \ldots S_{TN}>$ represents a vector of the success rates of the testcases 202 over time. The eigen value and eigen vector are computed for the vector S.

In one or more embodiments of the present invention, the eigen vector can be visualized in several ways, such as a line graph. The eigen vectors and eigen values, over time, indicate improvement, and degradation, of the testing process, and also highlight focal points for execution #n+1 of the testcases 202. In one or more embodiments of the present invention, the eigen vectors, representing the success rates of the testcases can be used to create a unit vector representing testing model coverage over time. Further, the eigen vectors and eigen values can be used to monitor/track changes in quality of outcomes because of changes to existing testcases, generation of new testcases, changes to the SUT 214, or any other changes. Accordingly, the eigen values and eigen vectors can facilitate quantifying and monitoring the testcase quality as the SUT 214 and the testing environment 100 changes. This provides a user with a new metric to maintain and enhance a test infrastructure.

In one or more embodiments of the present invention, the success rates ($S_{AV}$) are stored in the form of the Karnaugh map, or any other data structure for the visualization 800. Surface local minima and maxima of the Karnaugh map can, respectively, identify attribute-value pairs deficient in testing by the present model, and attribute-value pairs that are inversely covered with robustness. In one or more embodiments of the present invention, the testing environment 100 can indicate that more or different resources may be needed to properly test or stress the SUT 214. Further, multiple such visualizations 800 obtained over multiple testcase executions can be used to assess the SUT 214. For example, the visualization 800 can be compared to one or more versions of the visualization 800 to isolate patterns over time to indicate how the SUT 214 and/or the testing infrastructure 100 matured and changed. The baseline versions used for comparison can be one or more visualizations 800 that are generated using the SUT 214 itself. Alternatively, or in addition, the baseline visualizations 800 can include a reference visualization that was generated offline using a different instance of the SUT 214.

In one or more embodiments of the present invention, clustering can be performed on each set of the visualizations 800 at each release version of the SUT 214, and identify individual maps that migrate from one cluster to another that are disparate with their peer's migration. For example, localized hotspots can migrate as the hidden attribute is triggered, which correlates to assessing similar attributes/test scopes to determine whether the same attributes that cause the failure surface under multiple views.

Further, the analysis includes determining if the success rate $S_T$ of a first combination of values of a test vector (e.g., vector #1 in table 1) deviates from other combination of values of the same test vector (e.g., vectors #2 and #5 in table 1). If this condition is satisfied, it can be deemed that a hidden variable is associated with the testcases 202 that use the first test vector. For example, if a first combination of attribute-values for a test vector has a first success rate, e.g., 50%, and all other combinations of the attribute-values have a second success rate, e.g., 100%, the first combination is deemed to trigger a soft failure. In one or more embodiments of the present invention, the user can be notified of the testcases 202, the test vectors, and the combination of attribute-values that trigger such soft failures, at block 716.

Additionally, if the success rate $S_T$ of a particular testcase is below a predetermined threshold, e.g., 50%, over the predetermined number of test executions (or duration), a "hidden attribute-value" can be detected if a threshold success rate $S_T$ is satisfied by using the one or more additional values by adding one or more values to the range of attribute-values and monitoring the success rate $S_T'$ of the new attribute-values over time at block 718.

Alternatively, or in addition, at block 718, the hidden-attribute value can be detected based on a set of success rates ($S_{AV}$) corresponding to a set of attribute-value pairs associated with an attribute are all below a predetermined threshold. The attribute can then be further diagnosed by adding more test vectors using additional attribute-values and executing the testcases using the additional attribute-values. If the success rates $S_{AV}'$ of the testcases executed with the additional attribute-values satisfies the predetermined threshold, a hidden attribute-value condition has been identified and the hidden value has been found. The user is notified accordingly.

If the threshold success rate is not satisfied, the user may be notified of a hidden attribute or to diagnose the SUT 214 based on determining whether a hidden attribute exists, at block 720. That is, additional attribute may be required to exercise the code paths that are causing the testcases to fail with the particular test vector.

Figure 9:
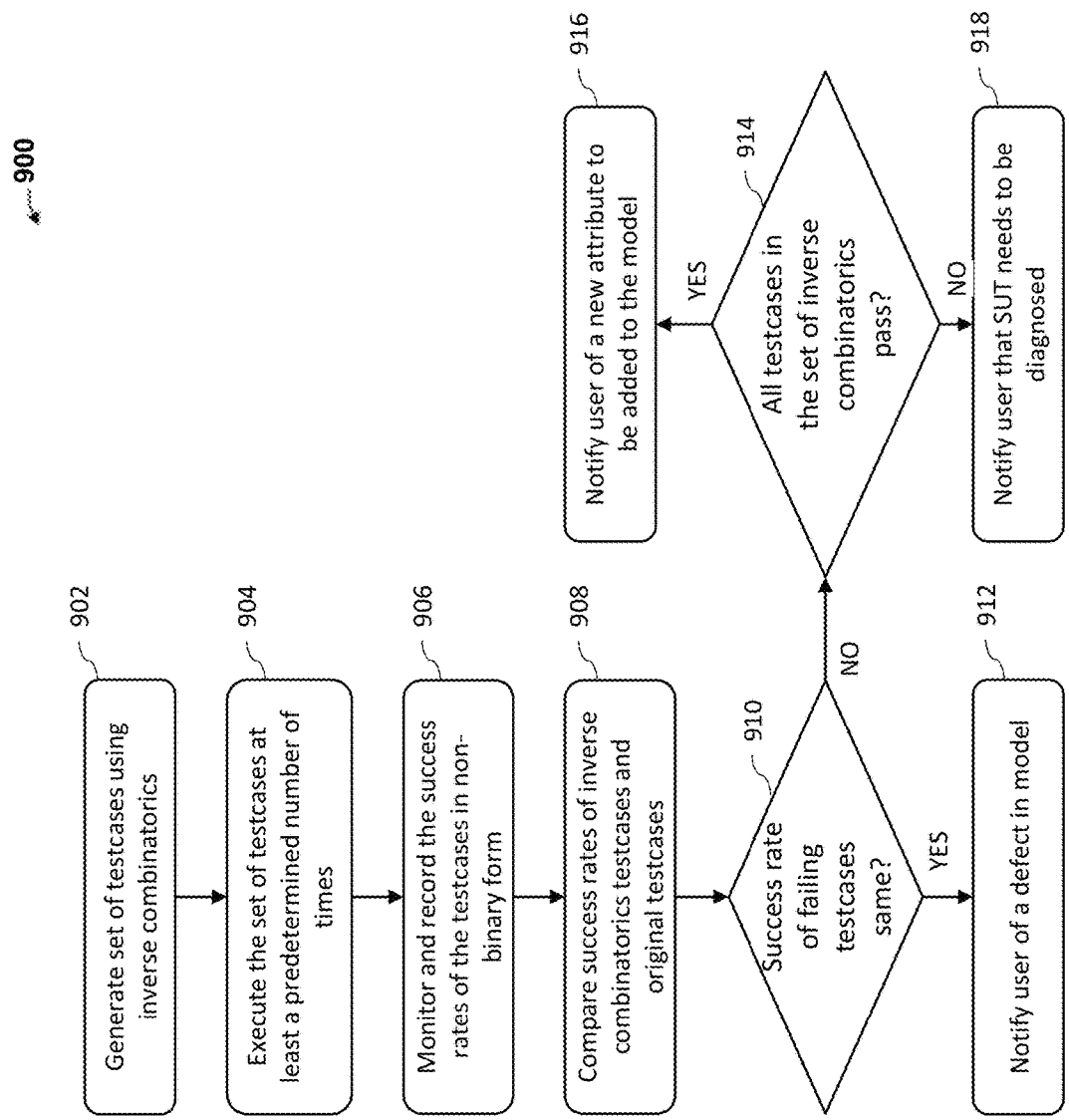
FIG. 9 depicts a flowchart of a method for determining if a hidden attribute exists in the present testing model according to one or more embodiments of the present invention.

FIG. 9 depicts a flowchart of a method for determining if a hidden attribute exists in the present testing model according to one or more embodiments of the present invention. The method 900 is triggered in response to detecting that success rate $S_T$ of a testcase is below a predetermined threshold, e.g., 50%. It should be noted that the success rate $S_T$ in all the examples herein, except where explicitly mentioned, is above 0%, because $S_T=0\%$ indicates that the testcase is consistently failing. Here, the testcase is succeeding and failing intermittently, and hence, the technical challenge of determining whether the fault lies in the SLIT 214, the testcase, the environment (soft failure), or any other factor.

The method 900 includes generating an entire set of inverse combinatorial testcases based on the present model, the attribute-value pairs from the test vector, and the intermittently failing testcases 202, at block 902. Known techniques of inverse CTD can be used to generate the set of testcases. The set of testcases that is generated has the same number of testcases as the intermittently failing testcases 202, with one-to-one correspondence between a testcase A from the original set of testcases and a corresponding testcase A' in the inverse combinatorial testcases.

An inverse combinatoric set is defined as a set of mutated test vectors where one attribute value is replaced with another value from the original test model. For a minimal mutation, n test vectors are created where n is the number of attributes in the initial failing test vector. For example, if a failed test vector is <Andrew, Black, New York, 20, 0> (See Table 2), a maximum inverse combinatoric set is:

| Debbie | Black | New York | 20 | 0 |
| Ryan | Black | New York | 20 | 0 |
| Mike | Black | New York | 20 | 0 |
| Dale | Black | New York | 20 | 0 |
| Daniel | Black | New York | 20 | 0 |
| Andrew | Blue | New York | 20 | 0 |
| Andrew | Red | New York | 20 | 0 |
| Andrew | Yellow | New York | 20 | 0 |
| Andrew | Orange | New York | 20 | 0 |
| Andrew | Black | Connecticut | 20 | 0 |
| Andrew | Black | Maine | 20 | 0 |
| Andrew | Black | Pennsylvania | 20 | 0 |
| Andrew | Black | New York | 30 | 0 |
| Andrew | Black | New York | 40 | 0 |
| Andrew | Black | New York | 50 | 0 |
| Andrew | Black | New York | 20 | 8 |

A minimal inverse combinatoric set in this example can be:

| Ryan | black | New York | 20 | 0 |
| Andrew | blue | New York | 20 | 0 |
| Andrew | black | Pennsylvania | 20 | 0 |
| Andrew | black | New York | 30 | 0 |
| Andrew | black | New York | 20 | 0 |

The set of inverse combinatorial testcases is executed at least a predetermined number of times, at block 904. The success rates $S_T'$ of the set of inverse combinatorial testcases is recorded and stored, at block 906. The success rates $S_T'$ of the set of inverse combinatorial testcases are computed using Pseudo-Boolean algebra in the same manner as the success rates of the original testcases.

The success rates $S_T'$ of the inverse combinatorial testcases are compared with the corresponding success rates $S_T$ of the intermittently failing testcases, i.e., original testcases, at block 908. In one or more embodiments of the present invention, the comparison can be performed by comparing the eigen value of the vector of the success rate $S_T'$ with the eigen value of the vector of the success rates $S_T$.

If all of the failing tests in the inverse combinatorial testcases fail at the same rate as those in the original set of testcases, it can be deemed that there is a defect with the testing model, at block 910. For example, if the two eigen values are the same, the two sets of testcases are deemed to be failing at the same rate. The user is notified that the testing model needs to be diagnosed and revised in this case, at block 912.

Alternatively, if none of the testcases in the set of inverse combinatorial testcase fail, then it is deemed that a hidden model attribute is to be added to the model, and the user is notified accordingly, at blocks 914 and 916. If the rate of failing of the testcases is different, and at least some of the testcases in the set of inverse combinatorial testcase fail, then the user is notified that the SUT 214 has to be diagnosed to determine cause of the failing testcases, at block 918.

Figure 10:
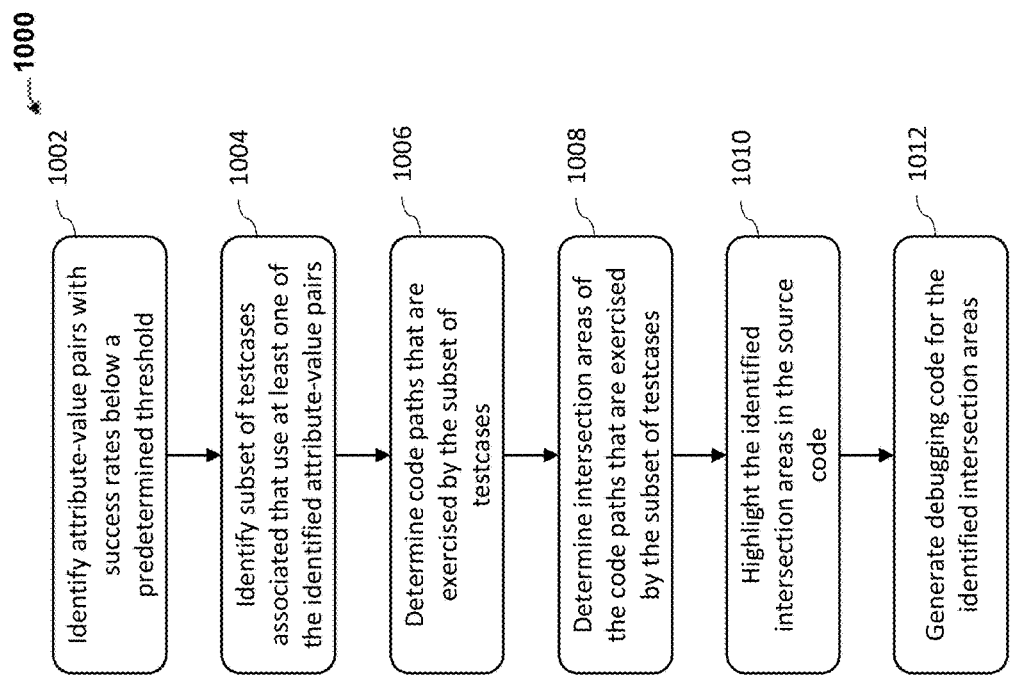
FIG. 10 depicts a flowchart of a method for identifying portions of the system under test that drive a hidden attribute according to one or more embodiments of the present invention.

FIG. 10 depicts a flowchart of a method for identifying portions of the SUT that drive a hidden attribute according to one or more embodiments of the present invention. As described so far, using Pseudo-Boolean algebra, eigen vectors, and non-uniform table heat-maps can help to identify the testcases that reveal that the model is missing one or more attributes, i.e., hidden attributes. The next technical challenge is to determine what these hidden attributes are for a given model. Embodiments of the present invention address these technical challenges by using Pseudo-Boolean algebra, eigen vectors, and non-uniform table heat-maps to identify and generate additional testcases that drive the path corresponding to lower pseudo-Boolean values in the original set of testcases. Darker areas of the visualization 800, which represent attribute-value pairs with success rate values below a predetermined threshold, are indicative of testcases that expose hidden attributes in the model.

Figure 11:
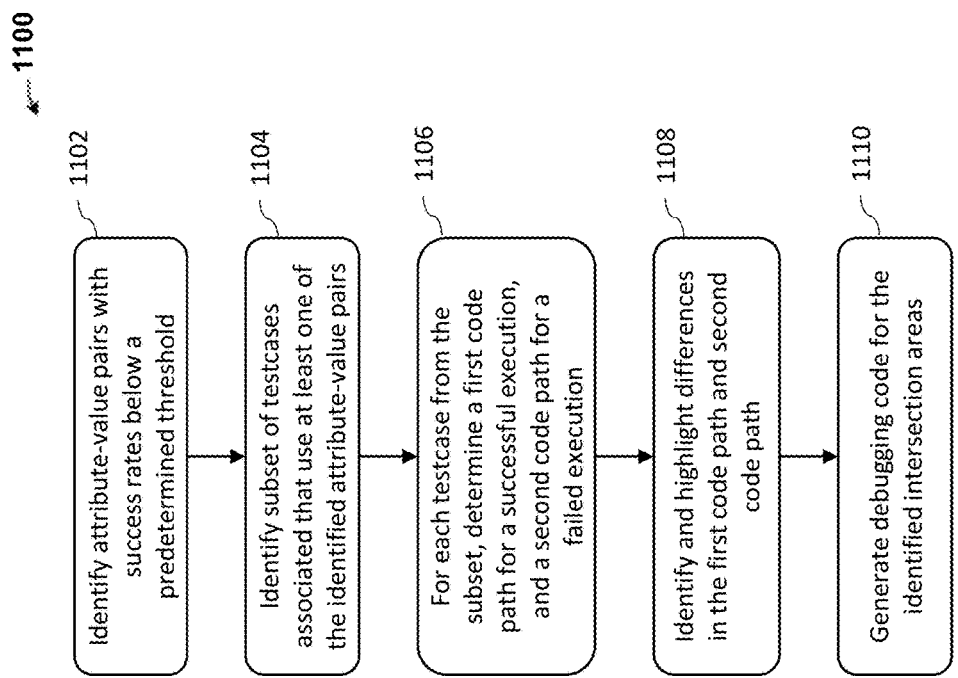
FIG. 11 depicts a flowchart of a method for identifying portions of the SUT that drive a hidden attribute according to one or more embodiments of the present invention.

Embodiments of the present invention, such as the method 1000 in FIG. 10, and method 1100 in FIG. 11, facilitate using breakpoints to trace the code paths of successful and failing runs of the testcases to isolate the portions, for example, code paths that those testcases exercise. One or more portions of the SUT 214, for example, code paths, are identified and highlighted as areas to investigate further to identify hidden attributes based on system configurations and timing windows.

The method 1000 includes identifying a set of attribute-value pairs that have success rates ($S_{AV}$) below a predetermined threshold, at block 1002. The attribute-value pairs are those that will be represented with darker shades in the visualization 800, in which the success rates ($S_{AV}$) are used to determine the shading of the squares; lower the $S_{AV}$, darker the square. In one or more embodiments of the present invention, a user selects one or more squares in the visualization 800 that are to be investigated further using a graphical user interface (GUI). Alternatively, or in addition, the user can provide the threshold $S_{AV}$ to select the squares with $S_{AV}$ lower (or greater) than the threshold.

Further, at block 1004, a subset of testcases from the testcases 202 that are executed is identified, where the testcases from the subset use at least one of attribute-value pair from the identified set of attribute-value pairs. Identifying the subset of testcases can be performed by scanning the testcases 202 to identify the testcases that use any of the identified attribute-value pairs. Alternatively, the test execution engine 108, or the test generator 208 keep a record of the testcases and corresponding attribute-value pairs.

At block 1006, code paths associated with the subset of testcases are determined. The code paths can be determined using the fingerprints 206 associated with each of the testcase in the subset.

At block 1008, intersection areas of the code paths are determined. The intersection areas further zoom into, or hone into, portions of the SUT 214 that are causing the most intermittent success/failures of the testcases 202. In one or more embodiments of the present invention, the intersection areas of the code paths are highlighted in the source code of the SUT 214, at block 1010.

In one or more embodiments of the present invention, debugging code is generated to diagnose the portions of the SUT 214 that are identified in this manner, at block 1012. The debugging code can be provided to the user to apply and diagnose the soft failures or any other defects causing the intermittent success/failure of the testcases. For example, if the SUT 214 is based on Z/OS®, commands such as SLIP or any other such commands used to investigate performance related concerns can be used to generate the debugging code. It is understood that if the SUT 214 is using any other architecture or operating system, performance related commands from that architecture will be used to generate the debugging code.

FIG. 11 depicts a flowchart of a method for identifying portions of the SUT that drive a hidden attribute according to one or more embodiments of the present invention. Method 1100 includes identifying a set of attribute-value pairs that have success rates ($S_{AV}$) below a predetermined threshold, at block 1102. The attribute-value pairs are those that will be represented with darker shades in the visualization 800, in which the success rates ($S_{AV}$) are used to determine the shading of the squares; lower the $S_{AV}$, darker the square. In one or more embodiments of the present invention, a user selects one or more squares in the visualization 800 that are to be investigated further using a graphical user interface (GUI). Alternatively, or in addition, the user can provide the threshold $S_{AV}$ to select the squares with $S_{AV}$ lower (or greater) than the threshold.

Further, at block 1104, a subset of testcases from the testcases 202 that are executed is identified, where the testcases from the subset use at least one of attribute-value pair from the identified set of attribute-value pairs. Identifying the subset of testcases can be performed by scanning the testcases 202 to identify the testcases that use any of the identified attribute-value pairs. Alternatively, the test execution engine 108, or the test generator 208 keep a record of the testcases and corresponding attribute-value pairs.

For each testcase in the subset of testcases, determine a first code path associated with a successful execution of the testcase, and determine a second code path associated with a failed execution of the testcase, at block 1106. The code paths can be determined using the fingerprints 206 associated with each of the testcase in the subset.

The first code path and the second code path are compared to identify portions of the code path that are different, and these portions are highlighted for inspection by a user, at block 1108. Code paths can be compared using text comparison to compare the source code that is in the code paths, in one or more embodiments of the present invention. The highlighting of the portions of the code paths can be performed by sending commands to a graphical user interface that identify the portions of the source code that are to be marked and highlighted.

In one or more embodiments of the present invention, debugging code is generated to diagnose the portions of the SUT 214 that are identified in this manner, at block 1110. The debugging code can be provided to the user to apply and diagnose the soft failures or any other defects causing the intermittent success/failure of the testcases. For example, if the SUT 214 is based on Z/OS®, commands such as SLIP or any other such commands used to investigate performance related concerns can be used to generate the debugging code. It is understood that if the SUT 214 is using any other architecture or operating system, performance related commands from that architecture will be used to generate the debugging code.

Embodiments of the present invention accordingly facilitate focus artistic testing on darker (or lighter) areas in the visualization 800 because those areas highlight defects that cause the testcase to succeed/fail more intermittently compared to other areas of the visualization 800. Embodiments of the present invention further facilitate using break points, fingerprints, or other techniques to highlight areas in the source code of the SUT 214 to be investigated further based on the visualization 800 depicted weak spots.

Utilizing Pseudo-Boolean algebra, such as Heyting algebra, the testing system 100 can quantize the success rate of a testcase while encapsulating the hidden variables that consistently affect the outcome of the testcase. This enables a user to more reliably identify when the testcase is failing due to factors beyond the test infrastructure itself such that resources can be adjusted or new test infrastructure can be developed accordingly. This enhanced success metric can be used to improve the efficiency and reliability of testing the stability of the SUT 214.

Figure 12:
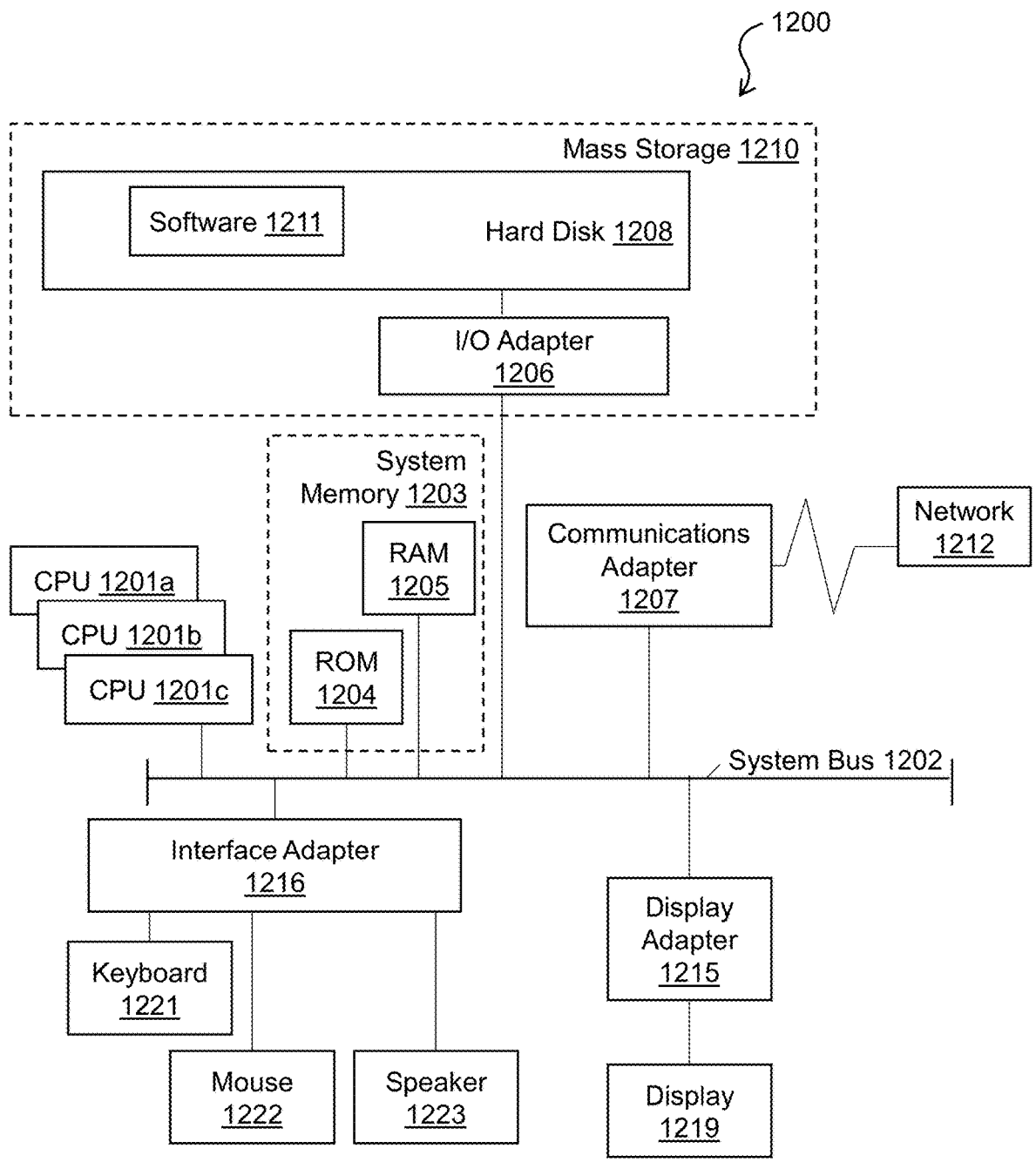
FIG. 12 depicts a computer system according to one or more embodiments of the present invention.

Turning now to FIG. 12, a computer system 1200 is generally shown in accordance with an embodiment. The computer system 1200 can be an electronic, computer framework comprising and/or employing any number and combination of computing devices and networks utilizing various communication technologies, as described herein. The computer system 1200 can be easily scalable, extensible, and modular, with the ability to change to different services or reconfigure some features independently of others. The computer system 1200 may be, for example, a server, desktop computer, laptop computer, tablet computer, or smartphone. In some examples, computer system 1200 may be a cloud computing node. Computer system 1200 may be described in the general context of computer system executable instructions, such as program modules, being executed by a computer system. Generally, program modules may include routines, programs, objects, components, logic, data structures, and so on that perform particular tasks or implement particular abstract data types. Computer system 1200 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, the computer system 1200 has one or more central processing units (CPU(s)) 1201a, 1201b, 1201c, etc. (collectively or generically referred to as processor(s) 1201). The processors 1201 can be a single-core processor, multi-core processor, computing cluster, or any number of other configurations. The processors 1201, also referred to as processing circuits, are coupled via a system bus 1202 to a system memory 1203 and various other components. The system memory 1203 can include a read only memory (ROM) 1204 and a random access memory (RAM) 1205. The ROM 1204 is coupled to the system bus 1202 and may include a basic input/output system (BIOS), which controls certain basic functions of the computer system 1200. The RAM is read-write memory coupled to the system bus 1202 for use by the processors 1201. The system memory 1203 provides temporary memory space for operations of said instructions during operation. The system memory 1203 can include random access memory (RAM), read only memory, flash memory, or any other suitable memory systems.

The computer system 1200 comprises an input/output (I/O) adapter 1206 and a communications adapter 1207 coupled to the system bus 1202. The I/O adapter 1206 may be a small computer system interface (SCSI) adapter that communicates with a hard disk 1208 and/or any other similar component. The I/O adapter 1206 and the hard disk 1208 are collectively referred to herein as a mass storage 1210.

Software 1211 for execution on the computer system 1200 may be stored in the mass storage 1210. The mass storage 1210 is an example of a tangible storage medium readable by the processors 1201, where the software 1211 is stored as instructions for execution by the processors 1201 to cause the computer system 1200 to operate, such as is described herein below with respect to the various Figures. Examples of computer program product and the execution of such instruction is discussed herein in more detail. The communications adapter 1207 interconnects the system bus 1202 with a network 1212, which may be an outside network, enabling the computer system 1200 to communicate with other such systems. In one embodiment, a portion of the system memory 1203 and the mass storage 1210 collectively store an operating system, which may be any appropriate operating system, such as the z/OS or AIX operating system from IBM Corporation, to coordinate the functions of the various components shown in FIG. 12.

Additional input/output devices are shown as connected to the system bus 1202 via a display adapter 1215 and an interface adapter 1216 and. In one embodiment, the adapters 1206, 1207, 1215, and 1216 may be connected to one or more I/O buses that are connected to the system bus 1202 via an intermediate bus bridge (not shown). A display 1219 (e.g., a screen or a display monitor) is connected to the system bus 1202 by a display adapter 1215, which may include a graphics controller to improve the performance of graphics intensive applications and a video controller. A keyboard 1221, a mouse 1222, a speaker 1223, etc. can be interconnected to the system bus 1202 via the interface adapter 1216, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 12, the computer system 1200 includes processing capability in the form of the processors 1201, and, storage capability including the system memory 1203 and the mass storage 1210, input means such as the keyboard 1221 and the mouse 1222, and output capability including the speaker 1223 and the display 1219.

In some embodiments, the communications adapter 1207 can transmit data using any suitable interface or protocol, such as the internet small computer system interface, among others. The network 1212 may be a cellular network, a radio network, a wide area network (WAN), a local area network (LAN), or the Internet, among others. An external computing device may connect to the computer system 1200 through the network 1212. In some examples, an external computing device may be an external webserver or a cloud computing node.

It is to be understood that the block diagram of FIG. 12 is not intended to indicate that the computer system 1200 is to include all of the components shown in FIG. 12. Rather, the computer system 1200 can include any appropriate fewer or additional components not illustrated in FIG. 12 (e.g., additional memory components, embedded controllers, modules, additional network interfaces, etc.). Further, the embodiments described herein with respect to computer system 1200 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 13:
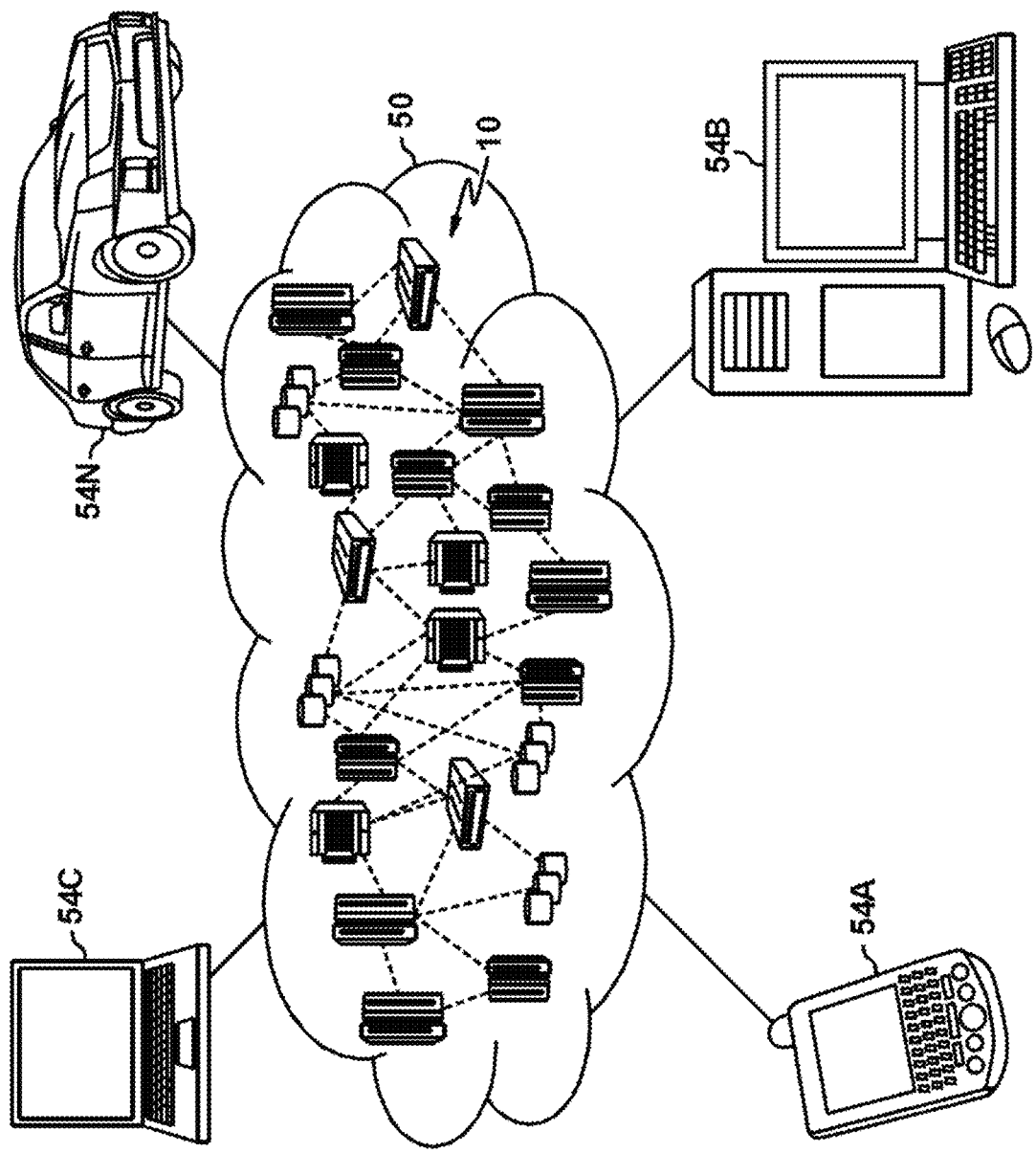
FIG. 13 depicts a cloud computing environment according to one or more embodiments of the present invention.

Referring now to FIG. 13, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 13 are intended to be illustrative only and that computing nodes 10 and cloud computing environment 50 can communicate with any type of computerized device over any type of network and/or network addressable connection (e.g., using a web browser).

Figure 14:
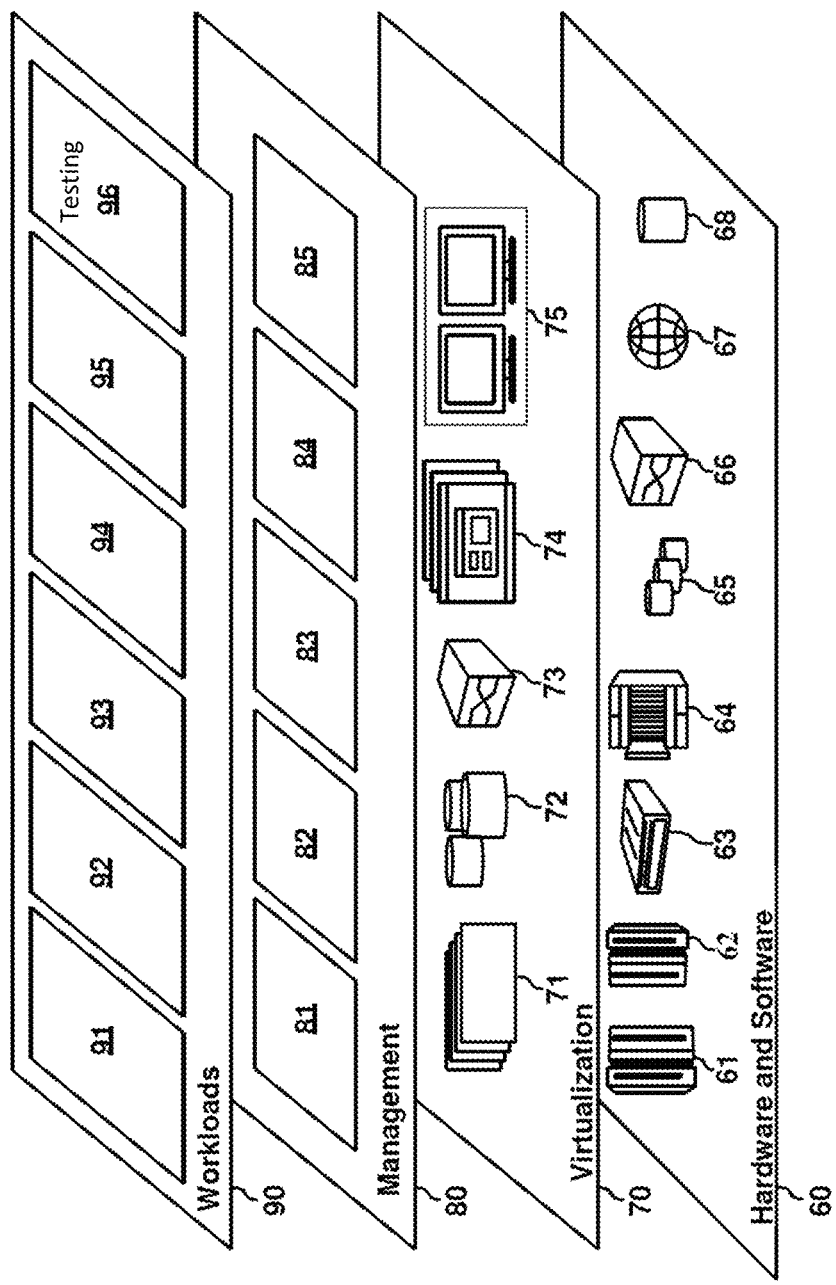
FIG. 14 depicts abstraction model layers according to one or more embodiments of the present invention.

Referring now to FIG. 14, a set of functional abstraction layers provided by cloud computing environment 50 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and testing 96.

In one or more embodiments of the present invention, the computer system can be the environment 100 with the SUT 214 being a computer program or a hardware component being used by the computer system. In one or more embodiments of the present invention, the computer system can be the SUT 214, which is part of a server cluster.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source-code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instruction by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

What is claimed is:

1. A method for detecting and localizing a fault when testing a system under test (SUT), the method comprising:
    modeling inputs to the SUT as a collection of attribute-value pairs;
    generating an initial set of test vectors that provides complete n-wise coverage of a test space represented by the attribute-value pairs;
    generating a set of testcases from the initial set of test vectors using combinatorics test design;
    executing the set of testcases to obtain a set of execution results, the execution results being in binary form indicative that a testcase succeeded or failed, the set of testcases executed a plurality of times;
    updating, for each execution of the set of testcases, for each testcase, a non-binary success rate ($S_T$) based on the set of execution results;

in response to a first success rate corresponding to a particular testcase being below a predetermined threshold:
  generating a second set of testcases based on the test vectors, the second set of testcases generated using inverse combinatorics test design;
  executing the second set of testcases to obtain a second set of execution results using a second set of test vectors, the second set of testcases executed at least a predetermined number of times; and
  updating, for each execution of the second set of testcases, for each testcase, a second success rate ($S_T'$) based on the second set of execution results; and
  in response to the second success rate corresponding to the particular testcase being within a predetermined threshold of the first success rate, notifying a user of a defect in the modeling of the inputs to the SUT.

2. The method of claim 1, wherein the non-binary success rate $S_T$ is computed using Pseudo-Boolean algebra.

3. The method of claim 1, further comprising, in response to the second success rate corresponding to the particular testcase not being within the predetermined threshold of the first success rate, and in response to all of the testcases in the second set of testcases being successful, notifying the user that an attribute is to be added to test the SUT.

4. The method of claim 3, wherein in response to all of the testcases in the second set of testcases not being successful, outputting, to the user, an identification of the particular testcase to be used for diagnosing a soft failure associated with the SUT.

5. The method of claim 4, wherein a soft failure is caused by one or more operating conditions of the SUT.

6. The method of claim 1, wherein a Cartesian product space comprising all possible combinations of the attribute-value pairs is reduced to a reduced test space at least in part using combinatorics test designing.

7. The method of claim 6, wherein the Cartesian product space is further reduced based on an architectural restriction of the SUT.

8. A system comprising:
a memory; and
a processor coupled with the memory, the processor configured to perform a method for detecting and localizing a fault when testing a system under test (SUT), the method comprising:
modeling inputs to the SUT as a collection of attribute-value pairs;
generating an initial set of test vectors that provides complete n-wise coverage of a test space represented by the attribute-value pairs;
generating a set of testcases from the initial set of test vectors using combinatorics test design;
executing the set of testcases to obtain a set of execution results, the execution results being in binary form indicative that a testcase succeeded or failed, the set of testcases executed a plurality of times;
updating, for each execution of the set of testcases, for each testcase, a non-binary success rate ($S_T$) based on the set of execution results;
in response to a first success rate corresponding to a particular testcase being below a predetermined threshold:
  generating a second set of testcases based on the test vectors, the second set of testcases generated using inverse combinatorics test design;
  executing the second set of testcases to obtain a second set of execution results using a second set of test vectors, the second set of testcases executed at least a predetermined number of times; and
  updating, for each execution of the second set of testcases, for each testcase, a second success rate ($S_T'$) based on the second set of execution results; and
  in response to the second success rate corresponding to the particular testcase being within a predetermined threshold of the first success rate, notifying a user of a defect in the modeling of the inputs to the SUT.

9. The system of claim 8, wherein the non-binary success rate $S_T$ is computed using Pseudo-Boolean algebra.

10. The system of claim 8, wherein the method further comprises, in response to the second success rate corresponding to the particular testcase not being within the predetermined threshold of the first success rate, and in response to all of the testcases in the second set of testcases being successful, notifying the user that an attribute is to be added to test the SUT.

11. The system of claim 10, wherein in response to all of the testcases in the second set of testcases not being successful, outputting, to the user, an identification of the particular testcase to be used for diagnosing a soft failure associated with the SUT.

12. The system of claim 11, wherein a soft failure is caused by one or more operating conditions of the SUT.

13. The system of claim 8, wherein a Cartesian product space comprising all possible combinations of the attribute-value pairs is reduced to a reduced test space at least in part using combinatorics test designing.

14. The system of claim 13, wherein the Cartesian product space is further reduced based on an architectural restriction of the SUT.

15. A computer program product comprising one or more computer-readable storage media having computer-executable instructions stored thereupon, which when executed by a processor cause the processor to perform a method for detecting and localizing a fault when testing a system under test (SUT), the method comprising:
modeling inputs to the SUT as a collection of attribute-value pairs;
generating an initial set of test vectors that provides complete n-wise coverage of a test space represented by the attribute-value pairs;
generating a set of testcases from the initial set of test vectors using combinatorics test design;
executing the set of testcases to obtain a set of execution results, the execution results being in binary form indicative that a testcase succeeded or failed, the set of testcases executed a plurality of times;
updating, for each execution of the set of testcases, for each testcase, a non-binary success rate ($S_T$) based on the set of execution results;
in response to a first success rate corresponding to a particular testcase being below a predetermined threshold:
  generating a second set of testcases based on the test vectors, the second set of testcases generated using inverse combinatorics test design;
  executing the second set of testcases to obtain a second set of execution results using a second set of test vectors, the second set of testcases executed at least a predetermined number of times; and updating, for each execution of the second set of testcases, for each testcase, a second success rate ($S_T$) based on the second set of execution results; and in response to the second success rate corresponding to the particular testcase being within a predetermined threshold of the first success rate, notifying a user of a defect in the modeling of the inputs to the SUT.

16. The computer program product of claim 15, wherein the non-binary success rate $S_T$ is computed using Pseudo-Boolean algebra.

17. The computer program product of claim 15, wherein the method further comprises, in response to the second success rate corresponding to the particular testcase not being within the predetermined threshold of the first success rate, and in response to all of the testcases in the second set of testcases being successful, notifying the user that an attribute is to be added to test the SUT.

18. The computer program product of claim 17, wherein in response to all of the testcases in the second set of testcases not being successful, outputting, to the user, an identification of the particular testcase to be used for diagnosing a soft failure associated with the SUT.

19. The computer program product of claim 15, wherein a soft failure is caused by one or more operating conditions of the SUT.

20. The computer program product of claim 15, wherein a Cartesian product space comprising all possible combinations of the attribute-value pairs is reduced to a reduced test space at least in part using combinatorics test designing.

* * * * *